US012407019B2

(12) United States Patent
Hersam et al.

(10) Patent No.: US 12,407,019 B2
(45) Date of Patent: Sep. 2, 2025

(54) GEL ELECTROLYTES FOR ELECTROCHEMICAL DEVICES, FABRICATING METHODS AND APPLICATIONS OF SAME

(71) Applicant: NORTHWESTERN UNIVERSITY, Evanston, IL (US)

(72) Inventors: Mark C. Hersam, Wilmette, IL (US); Woo Jin Hyun, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 532 days.

(21) Appl. No.: 17/613,166

(22) PCT Filed: May 18, 2020

(86) PCT No.: PCT/US2020/033380
§ 371 (c)(1),
(2) Date: Nov. 22, 2021

(87) PCT Pub. No.: WO2020/242800
PCT Pub. Date: Dec. 3, 2020

(65) Prior Publication Data
US 2022/0209293 A1 Jun. 30, 2022

Related U.S. Application Data

(60) Provisional application No. 62/854,006, filed on May 29, 2019.

(51) Int. Cl.
*H01M 10/0565* (2010.01)
*H01M 4/38* (2006.01)
(Continued)

(52) U.S. Cl.
CPC ....... *H01M 10/0565* (2013.01); *H01M 4/382* (2013.01); *H01M 4/485* (2013.01);
(Continued)

(58) Field of Classification Search
CPC .. H01M 10/0565; H01M 4/382; H01M 4/485; H01M 4/505; H01M 4/525;
(Continued)

(56) References Cited

U.S. PATENT DOCUMENTS

| 2002/0136958 A1* | 9/2002 | Park | H01M 10/052 |
| | | | 429/189 |
| 2015/0221980 A1* | 8/2015 | Hillmyer | H01M 10/0565 |
| | | | 429/317 |
| 2019/0051904 A1* | 2/2019 | Zhamu | H01M 10/058 |

FOREIGN PATENT DOCUMENTS

| CN | 102249210 B | 9/2012 | |
| CN | 104852015 A * | 8/2015 | ............. B82Y 30/00 |

(Continued)

OTHER PUBLICATIONS

Li et al., "Hexagonal boron nitride nanosheet/carbon nanocomposite as a high performance cathode material towards aqueous asymmetric supercapacitors", Nov. 14, 2018, Ceramics International, 45, 4283-4289 (Year: 2018).*

(Continued)

*Primary Examiner* — Allison Bourke
*Assistant Examiner* — Robert Gene West
(74) *Attorney, Agent, or Firm* — troutman pepper locke; Tim Tingkang Xia, Esq.

(57) ABSTRACT

This invention discloses high-modulus, ion-conductive gel electrolytes and methods of making the gel electrolytes and electrochemical devices. The gel electrolytes include an ionic liquid and nanosheets mixed in the ionic liquid. The nanosheets in one example include exfoliated hexagonal boron nitride (hBN) nanosheets. Compared to conventional bulk hBN microparticles, exfoliated hBN nanosheets improve the mechanical properties of the gel electrolytes by about 2 orders of magnitude, while retaining high ionic conductivity at room temperature. Moreover, exfoliated (Continued)

hBN nanosheets are compatible with high-voltage cathodes, and impart exceptional thermal stability that allows high-rate operation of solid-state rechargeable lithium-ion batteries at high temperatures.

13 Claims, 16 Drawing Sheets

(51) Int. Cl.

| | | |
|---|---|---|
| H01M 4/485 | (2010.01) | |
| H01M 4/505 | (2010.01) | |
| H01M 4/525 | (2010.01) | |
| H01M 4/583 | (2010.01) | |
| H01M 10/0525 | (2010.01) | |

(52) U.S. Cl.
CPC ........... *H01M 4/505* (2013.01); *H01M 4/525* (2013.01); *H01M 4/583* (2013.01); *H01M 10/0525* (2013.01); *H01M 2300/0082* (2013.01); *H01M 2300/0085* (2013.01)

(58) Field of Classification Search
CPC ............. H01M 4/583; H01M 10/0525; H01M 2300/0082; H01M 2300/0085
USPC ........................................................ 429/492
See application file for complete search history.

(56) References Cited

FOREIGN PATENT DOCUMENTS

| | | | |
|---|---|---|---|
| CN | 105655561 B | | 8/2018 |
| JP | 2015187057 A | * | 10/2015 |
| KR | 10-2017-0037533 A | | 4/2017 |
| KR | 20170037533 A | * | 4/2017 |
| KR | 10-2017-0058407 A | | 5/2017 |
| KR | 10-2017-0127186 A | | 11/2017 |

OTHER PUBLICATIONS

Chu, S. & Majumdar, A. Opportunities and challenges for a sustainable energy future. Nature 488, 294-303 (2012).
Sun, Y., Liu, N. & Cui, Y. Promises and challenges of nanomaterials for lithium-based rechargeable batteries. Nat. Energy 1, 16071 (2016).
Schmuch, R., Wagner, R., Hörpel, G., Placke, T. & Winter, M. Performance and cost of materials for lithium-based rechargeable automotive batteries. Nat. Energy 3, 267-278 (2018).
Dunn, B., Kamath, H. & Tarascon, J.-M. Electrical energy for the grid: a choice of battery. Science 334, 928-935 (2011).
Goodenough, J. B. & Park, K.-S. The Li-ion rechargeable battery: a perspective. J. Am. Chem. Soc. 135, 1167-1176 (2013).
Tarascon J.-M. & Armand, M. Issues and challenges facing rechargeable lithium batteries. Nature 414, 359-367 (2001).
Balakrishnan, P. G., Ramesh, R. & Prem Kumar, T. Safety mechanisms in lithium-ion batteries. J. Power Sources 155, 101-414 (2006).
Manthiram, A., Yu, X. & Wang, S. Lithium battery chemistries enabled by solid-state electrolytes. Nat. Rev. Mater. 2, 16103 (2017).
Gao, Z. et al. Promises, challenges, and recent progress of inorganic solid-state electrolytes for all-solid-state lithium batteries. Adv. Mater. 30, 1705702 (2018).
Lau, J. et al. Sulfide solid electrolytes for lithium battery applications. Adv. Energy Mater. 8, 1800933 (2018).
Thangadurai V., Narayanan, S. & Pinzaru, D. Garnet-type solid-state fast Li ion conductors for Li batteries: critical review. Chem. Soc. Rev. 43, 4714-4727 (2014).
Bideau, J. L., Viaub, L. & Vioux, A. Ionogels, ionic liquid based hybrid materials. Chem. Soc. Rev. 40, 907-925 (2011).

Chen, N., Zhang, H., Li, L., Chen, R. & Guo, S. Ionogel electrolytes for high-performance lithium batteries: a review. Adv. Energy Mater. 8, 1702675 (2018).
Lewandowski, A. & Świderska-Mocek, A. Ionic liquids as electrolytes for Li-ion batteries—an overview of electrochemical studies. J. Power Sources 194, 601-609 (2009).
Garcia, B., Lavallée, S., Perron, G., Michot, C. & Armand, M. Room temperature molten salts as lithium battery electrolyte. Electrochim. Acta 49, 4583-4588 (2004).
Kim G.-T et al. Development of ionic liquid-based lithium battery prototypes. J. Power Sources 199, 239-246 (2012).
Choudhury, S., Mangal, R., Agrawal, A. & Archer, L. A. A highly reversible room-temperature lithium metal battery based on cross-linked hairy nanoparticles. Nat. Commun. 6, 10101 (2015).
Stone, G. M. et al. Resolution of the modulus versus adhesion dilemma in solid polymer electrolytes for rechargeable lithium metal batteries. J. Electrochem. Soc. 159, A222-A227 (2012).
Lu, Y., Korf, K., Kambe, Y., Tu, Z. & Archer, L. A. Ionic-liquid-nanoparticle hybrid electrolytes: applications in lithium metal batteries. Angew. Chem. Int. Ed. 53, 488-492 (2014).
Patel, M., Gnanavel, M. & Bhattacharyya, A. J. Utilizing an ionic liquid for synthesizing a soft matter polymer "gel" electrolyte for high rate capability lithium-ion batteries. J. Mater. Chem. 21, 17419-17424 (2011).
Lu, Y., Moganty, S. S., Schaefer, J. L. & Archer, L. A. Ionic liquid-nanoparticle hybrid electrolytes. J. Mater. Chem. 22, 4066-4072 (2012).
Moganty, S. S., Jayaprakash, N., Nugent, J. L., Shen, J. & Archer, L. A. Ionic-liquid-tethered nanoparticles: hybrid electrolytes. Angew. Chem. Int. Ed. 49, 9158-9161 (2010).
Lee, J. H. et al. Hybrid ionogels derived from polycationic polysilsesquioxanes for lithium ion batteries. Polymer 117, 160-166 (2017).
Pablos, J. L. et al. Highly efficient mixed Li+ transport in ion gel polycationic electrolytes. J. Memb. Sci. 545, 133-139 (2018).
Lee, J. H. et al. Hybrid ionogel electrolytes for high temperature lithium batteries. J. Mater. Chem. A 3, 2226-2233 (2015).
Kubota, Y., Watanabe, K., Tsuda, O. & Taniguchi, T. Deep ultraviolet light-emitting hexagonal boron nitride synthesized at atmospheric pressure. Science 317, 932-934 (2007).
Kim, K. K. et al. Synthesis of monolayer hexagonal boron nitride on Cu foil using chemical vapor deposition. Nano Lett. 12, 161-166 (2012).
Yan, K. et al. Ultrathin two-dimensional atomic crystals as stable interfacial layer for improvement of lithium metal anode. Nano Lett. 14, 6016-6022 (2014).
Rodrigues, M.-T. F. et al. Hexagonal boron nitride-based electrolyte composite for li-ion battery operation from room temperature to 150 °C. Adv. Energy Mater. 6, 1600218 (2016).
Liang, Y. T. & Hersam, M. C. Highly concentrated graphene solutions via polymer enhanced solvent exfoliation and terative solvent exchange. J. Am. Chem. Soc. 132, 17661-17663 (2010).
Rosso, M., Gobron, T., Brissot, C., Chazalviel, J.-N. & Lascaud, S. Onset of dendritic growth in lithium/polymer cells. J. Power Sources 97-98, 804-806 (2001).
Matsumoto, H., Sakaebe, H. & Tatsumi, K. Preparation of room temperature ionic liquids based on aliphatic onium cations and asymmetric amide anions and their electrochemical properties as a lithium battery electrolyte. J. Power Sources 146, 45-50 (2005).
MacNeil, D. D., Lu, Z., Chen, Z. & Dahn, J. R. A comparison of the electrode/electrolyte reaction at elevated temperatures for various Li-ion battery cathodes. J. Power Sources 108, 8-14 (2002).
Rodrigues, M.-T. F. et al. A materials perspective on Li-ion batteries at extreme temperatures. Nat. Energy 2, 17108 (2017).
Chen, K.-S. et al. Comprehensive enhancement of nanostructured lithium-ion battery cathode materials via conformal graphene dispersion. Nano Lett. 17, 2539-2546 (2017).
Hayamizu, K. Aihara, Y., Nakagawa, H., Nukuda, T. & Price, W. S. Ionic conduction and ion diffusion in binary room-temperature ionic liquids composed of [emim][BF4] and LiBF4. J. Phys. Chem. B 108, 19527-19532 (2004).

(56) References Cited

OTHER PUBLICATIONS

Grandjean, A., Malki, M., Simonnet, C., Manara, D. & Penelon, B. Correlation between electrical conductivity, viscosity, and structure in borosilicate glass-forming melts. Phys. Rev. B 75, 054112 (2007).
Andersson, A. S., Thomas, J. O., Kalska, B. & Haggstrom, L. Thermal stability of LiFePO4-based cathodes. Electrochem. Solid-State Lett. 3, 66-68 (2000).
Takahashi, M., Tobishima, S., Takei, K. & Sakurai, Y. Reaction behavior of LiFePO4 as a cathode material for rechargeable lithium batteries. Solid State Ionics 148, 283-289 (2002).
Delacourt, C., Poizot, P., Tarascon, J.-M. & Masquelier, C. The existence of a temperature-driven solid solution in LixFePO4 for $0 \leq x \leq 1$. Nat. Mater. 4, 254-260 (2005).
Korean Intellectual Property Office (ISR/KR), "International Search Report for PCT/US2020/033380", Korea, Sept 4, 2020.

\* cited by examiner

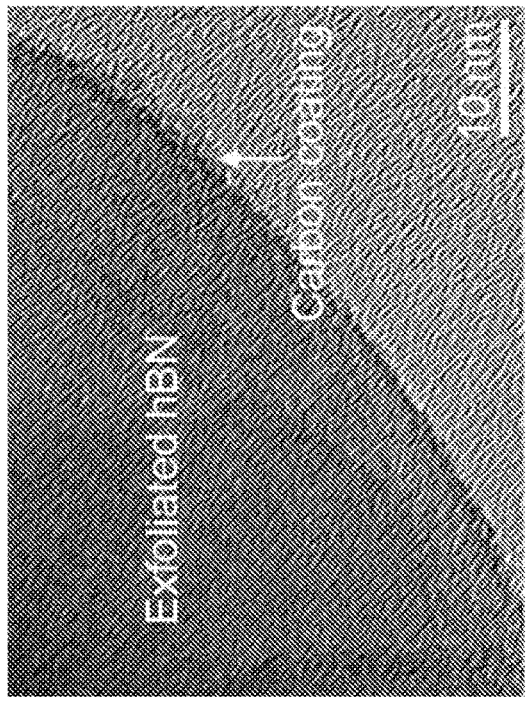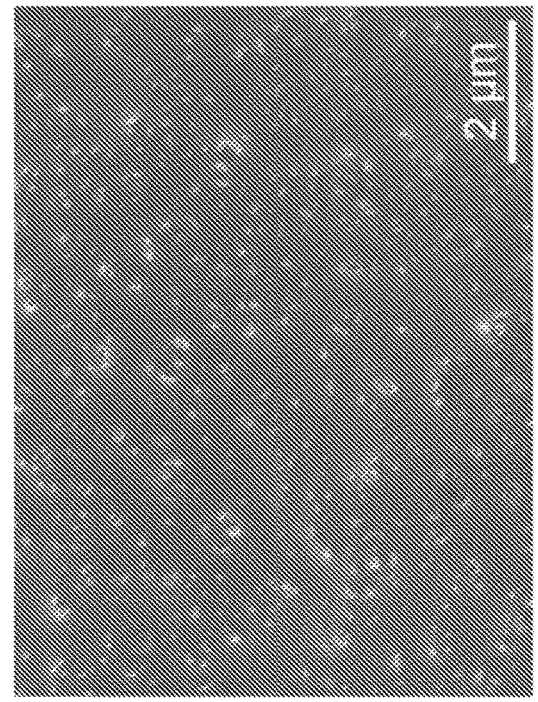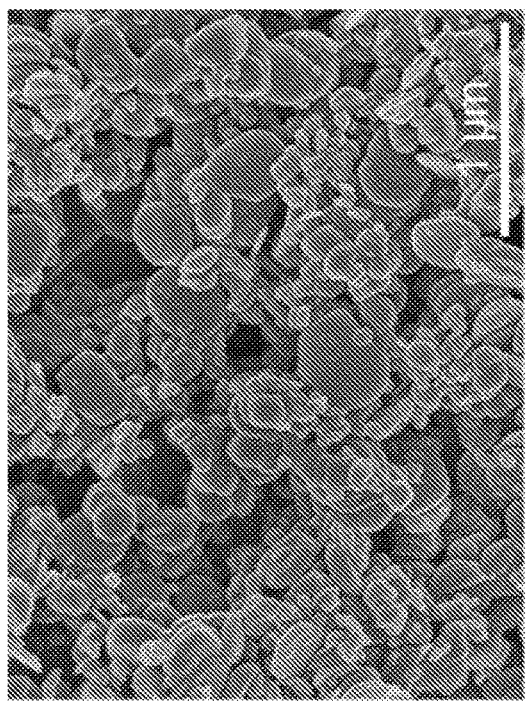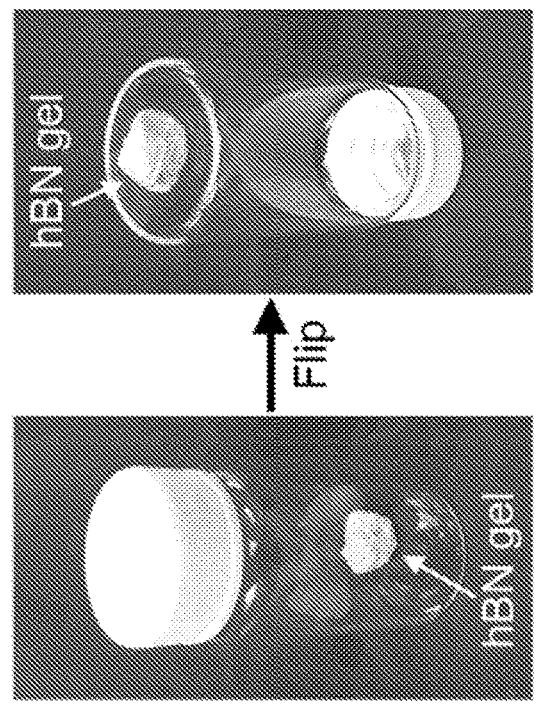
FIG. 1B
FIG. 1C
FIG. 1D
FIG. 1E

GEL ELECTROLYTES FOR ELECTROCHEMICAL DEVICES, FABRICATING METHODS AND APPLICATIONS OF SAME

CROSS-REFERENCE TO RELATED PATENT APPLICATIONS

This application claims priority to and the benefit of U.S. Provisional Application No. 62/854,006, filed May 29, 2019, which is incorporated herein in its entirety by reference.

STATEMENT AS TO RIGHTS UNDER FEDERALLY-SPONSORED RESEARCH

This invention was made with government support under DMR-1720139 and CMMI-1727846 awarded by the National Science Foundation, and DE-AC02-06CH11357 awarded by the Department of Energy. The government has certain rights in the invention.

FIELD OF THE INVENTION

The present invention relates generally to electrochemical devices, and more particularly to high-modulus nanosheet gel electrolytes for electrochemical devices such as solid-state rechargeable lithium-ion batteries, fuel cells, supercapacitors, transistors, etc., fabricating methods and applications of the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the invention.

Lithium-ion batteries are the primary power source for portable electronics and electric vehicles, as well as a core element of grid-level energy management systems. Their deployment in an increasing range of applications has motivated substantial efforts to advance rechargeable lithium-ion battery technology. Electrolytes are an essential component of lithium-ion batteries by enabling the reversible transport of lithium ions between the anode and cathode. Typical lithium-ion battery electrolytes are based on lithium salts and organic solvents, which require a porous membrane to physically separate the electrodes and prevent electrical shorting. In addition, liquid electrolytes based on organic solvents are highly flammable, which compromises safety and can lead to catastrophic battery failure. These stability concerns associated with conventional liquid electrolytes have become even more acute as lithium-ion batteries advance towards higher energy densities. Consequently, increasing attention has been devoted to the development of solid-state electrolytes that eliminate flammable organic solvents from lithium-ion batteries. However, currently available solid-state electrolytes present other significant challenges including low ionic conductivity, high interfacial resistance, and cumbersome processing, which has impeded their utilization in most lithium-ion battery contexts.

Electrolytes based on ionic liquids and a gelling matrix, also referred to as ion gels or ionogels, are promising candidates for solid-state lithium-ion batteries. Compared to the organic solvents used in traditional liquid electrolytes, ionic liquids offer several advantages including nonflammability, negligible vapor pressure, and high thermal and electrochemical stability. Moreover, when combined with a gelling matrix, ionic liquids form a composite solid-state electrolyte that can replace both the liquid electrolyte and separator in a single component. This consolidation of multiple functionalities into a single component allows for simplified packaging, streamlined manufacturing, and minimal risk of leakage. Furthermore, the mechanical strength enhancement from the gelling matrix provides improved resistance to lithium dendrite growth in lithium metal batteries. While these desirable mechanical properties can be enhanced by increasing the solid matrix loading, this approach leads to a tradeoff with ionic conductivity since increased solid loading impedes ion motion. Hence, despite extensive research into ionic liquid gel electrolytes based on diverse polymer and ceramic particle matrices, mechanical properties have typically been compromised to impart high ionic conductivity.

Therefore, a heretofore unaddressed need exists in the art to address the aforementioned deficiencies and inadequacies.

SUMMARY OF THE INVENTION

One of the objectives of this disclosure is to provide high-modulus, ion-conductive gel electrolytes to address the above-noted issues.

In one aspect of the invention, the gel electrolyte usable for an electrochemical device includes nanosheets of a compound; and an ionic liquid, where the nanosheets are mixed in the ionic liquid. The electrochemical device can be a solid-state rechargeable battery, a fuel cell, a supercapacitor, or a transistor.

In one embodiment, the compound includes hexagonal boron nitride (hBN).

In one embodiment, the nanosheets are coated with carbon. In one embodiment, the nanosheets are exfoliated from bulk microparticles of the compound.

In one embodiment, the ionic liquid includes a non-aqueous solvent of an ammonium-imidazolium-, pyrrolidinium-, pyridinium-, piperidinium-, phosphonium-, or sulfonium-based ionic liquid.

In one embodiment, the ionic liquid further includes one or more lithium salts including lithium bis(trifluoromethylsulfonyl)imide (LiTFSI), lithium bis(fluorosulfonyl)imide, (LiFSI), lithium hexafluorophosphate (LiPF$_6$), lithium tetrafluoroborate (LiBF$_4$), lithium perchlorate (LiClO$_4$), lithium trifluoromethanesulfonate, lithium fluoroalkylsufonimides, lithium fluoroarylsufonimides, lithium bis(oxalate borate), lithium tris(trifluoromethylsulfonylimide)methide, lithium tetrachloroaluminate, lithium chloride, or any combination thereof.

In one embodiment, the ionic liquid includes a lithium ionic liquid (Li-IL). In one embodiment, the non-aqueous solvent is EMIM-TFSI and the lithium salt is the LiTFSI salt.

In one embodiment, the gel electrolyte has about 20-55 wt. % of the nanosheets.

In another aspect, the invention relates to an electrochemical device including the gel electrolyte as disclosed above.

In one embodiment, the electrochemical device further includes an anode electrode and a cathode electrode, where the gel electrolyte is placed between the anode and the cathode electrodes.

In one embodiment, the gel electrolyte separates the anode and cathode electrodes without a separator.

In one embodiment, the anode electrode is formed of a lithium metal, graphite, lithium titanium oxide ($Li_4Ti_5O_{12}$, LTO), or a combination thereof.

In one embodiment, the cathode electrode is formed of lithium titanium oxide ($Li_4Ti_5O_{12}$, LTO), lithium iron phosphate ($LiFePO_4$, LFP), graphene-added LFP (Gr-LFP), lithium nickel manganese cobalt oxide ($LiNi_{0.33}Mn_{0.33}Co_{0.33}O_2$, NMC), lithium nickel manganese oxide ($LiNi_{0.5}Mn_{1.5}O_4$, LNMO), lithium cobalt oxide ($LiCoO_2$), lithium manganese oxide ($LiMn_2O_4$, LMO), lithium nickel cobalt aluminium oxide ($LiNiCoAlO_2$, NCA), or a combination thereof.

In one embodiment, the electrochemical device can be a solid-state rechargeable battery, a fuel cell, a supercapacitor, or a transistor.

In yet another aspect, the invention relates to a method for producing a gel electrolyte, including providing a first amount of exfoliated nanosheets of a compound, each nanosheet having a thin carbon coating thereon; and preparing a second amount of an ionic liquid and mixing the first amount of the exfoliated, carbon-coated nanosheets with the second amount of the imidazolium ionic liquid to form gel electrolyte.

In one embodiment, the providing step includes shear-mixing a dispersion containing bulk microparticles of the compound, a polymer, and ethanol; centrifuging the shear-mixed dispersion to remove large particles, after which supernatant is collected and mixed with an aqueous solution of sodium chloride to flocculate exfoliated nanosheets of the compound and the polymer; centrifuging the flocculated solution to sediment the exfoliated nanosheets and the polymer; rinsing the sedimented nanosheets and polymer with deionized water to remove residual sodium chloride, drying and grinding the rinsed nanosheets and polymer to yield a powder of the exfoliated nanosheets and the polymer; and annealing the powder to decompose the polymer, resulting in a thin carbon coating on the exfoliated nanosheets.

In one embodiment, the polymer includes ethyl cellulose (EC), nitrocellulose, polyacrylic acid (PAA), poly(vinylidene fluoride) (PVDF), polyethylene oxide (PEO), polyoxyethylene (POE), perfluorosulfonic acid (PFSA), or polyvinylpyrrolidone (PVP).

In one embodiment, the polymer comprises EC, and the annealing step is performed at a temperature in a ranges of about 300-500° C. for a period of time from about 1 h to about 3 h.

In one embodiment, the ionic liquid includes a non-aqueous solvent of an ammonium-imidazolium-, pyrrolidinium-, pyridinium-, piperidinium-, phosphonium-, or sulfonium-based ionic liquid.

In one embodiment, the ionic liquid further includes one or more lithium salts including LiTFSI, LiFSI, $LiPF_6$, $LiBF_4$, $LiClO_4$, lithium trifluoromethanesulfonate, lithium fluoroalkylsufonimides, lithium fluoroarylsufonimides, lithium bis(oxalate borate), lithium tris(trifluoromethylsulfonylimide)methide, lithium tetrachloroaluminate, lithium chloride, or any combination thereof.

In one embodiment, the ionic liquid includes an Li-IL. In one embodiment, the preparing step includes dissolving an amount of the one or more lithium salts in the non-aqueous solvent to form a mixture; and stirring the mixture with a magnetic stir means to obtain the Li-IL.

In one embodiment, the lithium salts comprise the LiTFSI salt, and the non-aqueous solvent comprises EMIM-TFSI.

In one embodiment, the mixing step is performed using a mortar and pestle.

In one embodiment, the compound includes hBN.

In a further aspect, the invention relates to methods for fabricating an electrochemical device, including producing the gel electrolyte as disclosed above; and placing the gel electrolyte between an anode electrode and a cathode electrode.

In one embodiment, the anode electrode is formed of a lithium metal, graphite, LTO, or a combination thereof.

In one embodiment, the cathode electrode is formed of LTO, LFP, Gr-LFP, NMC, LNMO, $LiCoO_2$, $LiMn_2O_4$, LMO, NCA, or a combination thereof.

In one exemplary embodiment, the gel electrolytes are formed of the Li-IL and exfoliated hBN nanosheets. Compared to conventional bulk hBN microparticles, the exfoliated hBN nanosheets improve the mechanical properties of gel electrolytes by 2 orders of magnitude (storage modulus about 5 MPa), while retaining high ionic conductivity at room temperature (greater than about 1 mS cm$^{-1}$). Moreover, exfoliated hBN nanosheets are compatible with high-voltage cathodes (greater than about 5 V vs Li/Li$^+$), and impart exceptional thermal stability that allows high-rate operation of solid-state rechargeable lithium-ion batteries at temperatures up to 175° C.

In one embodiment, the electrochemical device can be a solid-state rechargeable battery, a fuel cell, a supercapacitor, or a transistor.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

FIGS. 1A-1E show hexagonal boron nitride (hBN) nanosheets and gel electrolytes according to embodiments of the invention. FIG. 1A is a schematic diagram of hBN gel electrolyte preparation. hBN nanosheets are exfoliated from bulk hBN microparticles by a liquid-phase exfoliation method with ethyl cellulose (EC) stabilizers. The resulting exfoliated hBN/EC powder is annealed to decompose EC at about 400° C. for about 2 h, which generates a thin carbon coating on the surface of the hBN nanosheets. Finally, the hBN nanosheets and a lithium ionic liquid (Li-IL) are mixed to formulate gel electrolytes. FIG. 1B is a scanning electron microscopy (SEM) image of the exfoliated, carbon-coated hBN nanosheets. FIG. 1C is a transmission electron microscopy (TEM) image of the exfoliated, carbon-coated hBN nanosheets. The dark band (indicated by the arrow) at the edge of the exfoliated hBN nanosheet corresponds to the carbon coating. FIG. 1D is photographs of a vial with the hBN gel electrolyte before (left) and after (right) flipping. The electrolyte does not move from the bottom of the inverted vial, confirming the formation of a stable gel. FIG. 1E is an SEM image of the hBN gel electrolyte.

FIG. 2A shows storage modulus (G') of gel electrolytes using bulk hBN microparticles and exfoliated, carbon-coated hBN nanosheets. FIG. 2B shows a comparison to G' and room-temperature ionic conductivity of ionic liquid gel electrolytes previously reported for rechargeable lithium-ion batteries. The dashed lines represent isolines of the product of G' and ionic conductivity, and the number labels refer to the citation numbers in the references. FIG. 2C shows polarization voltage profiles of lithium symmetric cells (Li|gel electrolyte|Li) with gel electrolytes formulated with bulk hBN microparticles and exfoliated, carbon-coated hBN nanosheets, at a current density of about 0.04 mA cm$^1$. The sudden voltage drop indicates the formation of short circuits by lithium dendrites. FIG. 2D shows short circuit formation time ($T_s$) of the lithium symmetric cells as a function of current density. The data points describe the average and standard deviation from 3 samples.

FIG. 3A is a schematic of a lithium-ion battery operating with an hBN gel electrolyte. The hBN gel electrolyte separates anode and cathode electrodes without a separator, and lithium ions travel (indicated by the red dotted line) through Li-IL adsorbed on the surface of the hBN nanosheets. FIG. 3B shows charge-discharge voltage profiles of a $Li_4Ti_5O_{12}$ (LTO)|hBN gel|Li cell measured at 0.1 C at room temperature, with a voltage window of about 1.0-2.5 V. FIG. 3C shows cycling performance of the cell tested over 200 cycles (greater than about 6 months). Black, red, and blue symbols denote gravimetric charge capacity, gravimetric discharge capacity, and coulombic efficiency, respectively.

FIG. 4A shows typical charge-discharge voltage profiles of $LiFePO_4$ (LFP)|hBN gel|Li and LFP|Li-IL|Li cells tested at 0.1 C at room temperature, with a voltage window of about 2.5-4.0 V. FIG. 4B shows gravimetric discharge capacity and coulombic efficiency of the cells. FIG. 4C shows typical charge-discharge voltage profiles of $LiNi_{0.33}Mn_{0.33}Co_{0.33}O_2$ (NMC)|hBN gel|Li and NMC|Li-IL|Li cells measured at 0.1 C at room temperature, with a voltage window of about 2.0-4.3 V. FIG. 4D shows gravimetric discharge capacity and coulombic efficiency of the cells.

FIG. 5A shows charge-discharge voltage profiles of a $LiNi_{0.5}Mn_{1.5}O_4$ (LNMO)|Li-IL|Li cell tested at 0.1 C at room temperature, with a voltage window of about 3.5-5.0 V. FIG. 5B shows charge-discharge voltage profiles of an LNMO|hBN gel|Li cell measured with the same conditions. FIG. 5C shows average voltage ($V_{avg}$) of the charge curves of the cells as a function of cycle. FIG. 5D shows $V_{avg}$ of the discharge curves of the cells as a function of cycle.

FIG. 6A shows typical charge-discharge voltage profiles of a Gr-LFP|hBN gel|Li cell measured at room temperature and about 175° C., with a voltage window of about 2.0-4.0 V. The Gr-LFP cathode electrode is composed of LFP active materials and graphene conductive additives. FIG. 6B shows charge-discharge voltage profiles of the cell at 10 C at about 175° C.

FIG. 6C shows cycling performance of the cell tested at 10 C at about 175° C. Black, red, and blue symbols denote gravimetric charge capacity, gravimetric discharge capacity, and coulombic efficiency, respectively.

FIG. 8A shows XPS survey spectrum. FIG. 8A shows high-resolution XPS spectrum for C is with deconvolution. The carbon content in the survey spectrum originates from the carbon coating on the hBN nanosheet surface. The C is spectrum is deconvoluted into three peaks assigned to C—C at about 285 eV, C—O at about 286 eV, and O—C=O at about 289 eV.

FIG. 9A shows a lateral size distribution of about 100 hBN nanosheets measured by atomic force microscopy (AFM). FIG. 9A shows thickness distribution of the nanosheets. AFM measurements were performed on the samples drop-casted onto $Si/SiO_2$ substrates. The average lateral size and thickness are 143±67 nm and 2.4±1.2 nm, respectively.

FIG. 11A shows G' of the gel electrolytes as a function of frequency. FIG. 11B shows room-temperature ionic conductivity of gel electrolytes using bulk hBN microparticles without and with EC residue carbon coating. For this investigation, EC residue carbon coating was purposely generated on the surface of bulk hBN microparticles by dispersing the microparticles and EC in ethanol, evaporating ethanol, and annealing the bulk hBN/EC powder at about 400° C. for about 2 h to decompose EC. Compared to the pristine bulk hBN microparticles, carbon-coated bulk hBN microparticles improve the mechanical modulus of the gel electrolytes without a noticeable change in ionic conductivity.

FIG. 15A shows the data points are the measured ionic conductivities of the hBN gel electrolytes, and the solid lines are Vogel-Fulcher-Tammann (VFT) model curves fitted with the parameters in the table. The VFT model is expressed as $\sigma = A \exp[-B(T-T_0)]$, where A, B, and $T_0$ listed in FIG. 15B are the pre-exponential factor, the pseudoactivation energy term related to the entropic barrier to ion motion, and the ideal glass transition temperature, respectively. $R^2$ in the table denotes the coefficient of determination for the VFT model fits.

DETAILED DESCRIPTION OF THE INVENTION

Figure 1A:
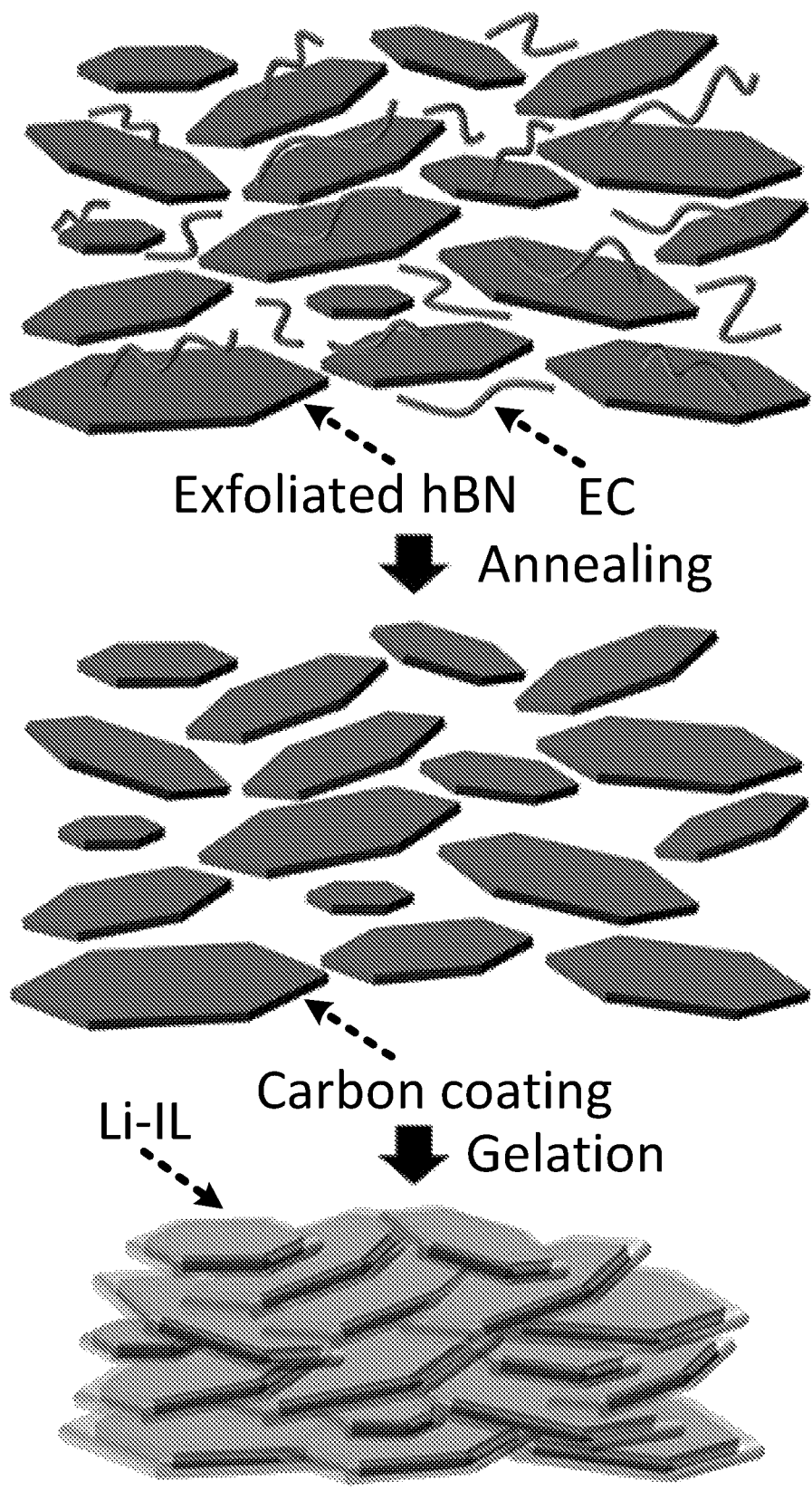

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used in this disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in this disclosure, the phrase "at least one of A, B, and C" should be construed to mean a logical (A or B or C), using a non-exclusive logical OR. As used herein, the term "and/or" includes any and all combinations of one or more of the associated listed items.

Embodiments of the invention are illustrated in detail hereinafter with reference to accompanying drawings. The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

Solid-state electrolytes based on ionic liquids and a gelling matrix are promising for rechargeable lithium-ion batteries due to their safety under diverse operating conditions, favorable electrochemical and thermal properties, and wide processing compatibility. However, gel electrolytes also suffer from low mechanical moduli, which imply poor structural integrity and thus an enhanced probability of electrical shorting, particularly under conditions that are favorable for lithium dendrite growth.

One of the objectives of this disclosure is to provide high-modulus, ion-conductive gel electrolytes to address the above-noted issues.

In one aspect of the invention, the gel electrolyte usable for an electrochemical device includes nanosheets of a compound and an ionic liquid, where the nanosheets are mixed in the ionic liquid. The electrochemical device can be a solid-state rechargeable battery, a fuel cell, a supercapacitor, a transistor, or the likes.

In one embodiment, the compound includes hexagonal boron nitride (hBN).

In one embodiment, the nanosheets are exfoliated from bulk microparticles of the compound, and coated with carbon.

In one embodiment, the ionic liquid includes an ammonium-imidazolium-, pyrrolidinium-, pyridinium-, piperidinium-, phosphonium-, or sulfonium-based ionic liquid as a non-aqueous solvent.

In one embodiment, the ionic liquid further includes one or more lithium salts including lithium bis(trifluoromethylsulfonyl)imide (LiTFSI), lithium bis(fluorosulfonyl)imide, (LiFSI), lithium hexafluorophosphate (LiPF$_6$), lithium tetrafluoroborate (LiBF$_4$), lithium perchlorate (LiClO$_4$), lithium trifluoromethanesulfonate, lithium fluoroalkylsufonimides, lithium fluoroarylsufonimides, lithium bis(oxalate borate), lithium tris(trifluoromethylsulfonylimide)methide, lithium tetrachloroaluminate, lithium chloride, or any combination thereof.

In one embodiment, the ionic liquid includes a lithium ionic liquid (Li-IL). In one embodiment, the Li-IL includes EMIM-TFSI containing the LiTFSI salt.

In one embodiment, the gel electrolyte has about 20-55 wt. % of the nanosheets.

In another aspect, the invention relates to an electrochemical device including the gel electrolyte as disclosed above.

In one embodiment, the electrochemical device further includes an anode electrode and a cathode electrode, where the gel electrolyte is placed between the anode and the cathode electrodes.

In one embodiment, the gel electrolyte separates the anode and cathode electrodes without a separator.

In one embodiment, the anode electrode is formed of a lithium metal, graphite, lithium titanium oxide (Li$_4$Ti$_5$O$_{12}$, LTO), or a combination thereof.

In one embodiment, the cathode electrode is formed of lithium titanium oxide (Li$_4$Ti$_5$O$_{12}$, LTO), lithium iron phosphate (LiFePO$_4$, LFP), graphene-added LFP (Gr-LFP), lithium nickel manganese cobalt oxide (LiNi$_{0.33}$Mn$_{0.33}$Co$_{0.33}$O$_2$, NMC), lithium nickel manganese oxide (LiNi$_{0.5}$Mn$_{1.5}$O$_4$, LNMO), lithium cobalt oxide (LiCoO$_2$), lithium manganese oxide (LiMn$_2$O$_4$, LMO), lithium nickel cobalt aluminium oxide (LiNiCoAlO$_2$, NCA), or a combination thereof.

In one embodiment, the electrochemical device can be a solid-state rechargeable battery, a fuel cell, a supercapacitor, a transistor, or the likes.

In yet another aspect, the invention relates to a method for producing a gel electrolyte, including providing a first amount of exfoliated nanosheets of a compound, each nano sheet having a thin carbon coating thereon; and preparing a second amount of an ionic liquid and mixing the first amount of the exfoliated, carbon-coated nanosheets with the second amount of the imidazolium ionic liquid to form gel electrolyte.

In one embodiment, the providing step includes shear-mixing a dispersion containing bulk microparticles of the compound, a polymer, and ethanol; centrifuging the shear-mixed dispersion to remove large particles, after which supernatant is collected and mixed with an aqueous solution of sodium chloride to flocculate exfoliated nanosheets of the compound and the polymer; centrifuging the flocculated solution to sediment the exfoliated nanosheets and the polymer; rinsing the sedimented nanosheets and polymer with deionized water to remove residual sodium chloride, drying and grinding the rinsed nanosheets and polymer to yield a powder of the exfoliated nanosheets and the polymer; and annealing the powder to decompose the polymer, resulting in a thin carbon coating on the exfoliated nanosheets.

In one embodiment, the polymer includes ethyl cellulose (EC), nitrocellulose, polyacrylic acid (PAA), poly(vinylidene fluoride) (PVDF), polyethylene oxide (PEO), polyoxyethylene (POE), perfluorosulfonic acid (PFSA), or polyvinylpyrrolidone (PVP).

In one embodiment, the polymer comprises EC, and the annealing step is performed at a temperature in a ranges of about 300-500° C. for a period of time from about 1 h to about 3 h.

In one embodiment, the ionic liquid includes an ammonium-imidazolium-, pyrrolidinium-, pyridinium-, piperidinium-, phosphonium-, or sulfonium-based ionic liquid as a non-aqueous solvent.

In one embodiment, the ionic liquid further includes one or more lithium salts including LiTFSI, LiFSI, LiPF$_6$, LiBF$_4$, LiClO$_4$, lithium trifluoromethanesulfonate, lithium fluoroalkylsufonimides, lithium fluoroarylsufonimides, lithium bis(oxalate borate), lithium tris(trifluoromethylsulfonylimide)methide, lithium tetrachloroaluminate, lithium chloride, or any combination thereof.

In one embodiment, the ionic liquid includes a Li-IL. In one embodiment, the preparing step includes dissolving an amount of the one or more lithium salts in the non-aqueous solvent to form a mixture; and stirring the mixture with a magnetic stir means to obtain the Li-IL. In one embodiment, the lithium salt is the LiTFSI salt, and the non-aqueous solvent is EMIM-TFSI.

In one embodiment, the mixing step is performed using a mortar and pestle.

In one embodiment, the compound includes hBN.

In a further aspect, the invention relates to methods for fabricating an electrochemical device, including producing the gel electrolyte as disclosed above; and placing the gel electrolyte between an anode electrode and a cathode electrode.

In one embodiment, the anode electrode is formed of a lithium metal, graphite, LTO, or a combination thereof.

In one embodiment, the cathode electrode is formed of LTO, LFP, Gr-LFP, NMC, LNMO, $LiCoO_2$, $LiMn_2O_4$, LMO, NCA, or a combination thereof.

In one exemplary embodiment, the gel electrolytes are formed of the Li-IL and exfoliated hBN nanosheets. Compared to conventional bulk hBN microparticles, the exfoliated hBN nanosheets improve the mechanical properties of gel electrolytes by 2 orders of magnitude (storage modulus about 5 MPa), while retaining high ionic conductivity at room temperature (>1 mS $cm^{-1}$). Moreover, exfoliated hBN nanosheets are compatible with high-voltage cathodes (>5 V vs $Li/Li^+$), and impart exceptional thermal stability that allows high-rate operation of solid-state rechargeable lithium-ion batteries at temperatures up to 175° C.

In one embodiment, the electrochemical device can be a solid-state rechargeable battery, a fuel cell, a supercapacitor, a transistor, or the likes.

According to the invention, the gel electrolytes based on the Li-IL and exfoliated hBN nanosheets may have applications in flexible electronics, and electrochemical devices, including, but not limited to solid-state rechargeable lithium-ion batteries, supercapacitors, transistors, and so on.

The high-modulus nanosheet hBN gel electrolytes of the invention has at least the following advantages over the existing electrolyte:

- Typical liquid electrolytes based on organic solvents for lithium-ion batteries are highly flammable, which compromise safety and can lead to catastrophic battery failure, whereas the hBN gel electrolytes provide high safety due to their nonflammability and negligible vapor pressure.
- There have been considerable efforts to develop solid-state electrolytes without flammable organic solvents in an effort to improve safety, but currently available solid-state electrolytes present other significant challenges including low ionic conductivity, high interfacial resistance, and cumbersome processing. In contrast, the hBN gel electrolytes offer high ionic conductivity, favorable electrochemical properties, and wide processing compatibility.
- Traditionally, the mechanical properties of gel electrolytes have been enhanced by increasing the solid matrix loading, which leads to a tradeoff with ionic conductivity since increased solid loading impedes ion motion. On the other hand, the exfoliated hBN nanosheets improve the mechanical properties of gel electrolytes by about 2 orders of magnitude without compromising ionic conductivity.
- The hBN nanosheets electrochemically stabilize the ionic liquid in the gel electrolytes, thereby reducing side reactions with electrodes at high potentials for lithium-ion batteries, compared to using ionic liquid electrolytes with a separator.
- Compared to typical polymer matrices for gel electrolytes, the hBN nanosheets possesses high thermal stability, rendering the hBN gel electrolyte promising for high-temperature applications.

These and other aspects of the present invention are further described in the following section. Without intending to limit the scope of the invention, further exemplary implementations of the present invention according to the embodiments of the present invention are given below. Note that titles or subtitles may be used in the examples for the convenience of a reader, which in no way should limit the scope of the invention. Moreover, certain theories are proposed and disclosed herein; however, in no way should they, whether they are right or wrong, limit the scope of the invention so long as the invention is practiced according to the invention without regard for any particular theory or scheme of action.

EXAMPLE

High-Modulus Hexagonal Boron Nitride Nanosheet Gel Electrolytes for Solid-State Rechargeable Lithium-Ion Batteries In one exemplary example, the gel electrolytes are formed of the Li-IL and exfoliated hBN nanosheets. As a solid matrix material, hBN possesses several desirable attributes including electrically insulating character, chemical inertness, thermal stability, and mechanical robustness. However, the difficulty in controlling the size of conventional bulk hBN microparticles hampers strong solidification of ionic liquid gels, resulting in poor mechanical strength. In the exemplary example, by using a scalable liquid-phase exfoliation method, homogeneous hBN nanosheets that interact strongly with ionic liquids are produced, which leads to significant enhancement of the mechanical modulus of the gel electrolytes by two orders of magnitude (storage modulus about 5 MPa), while maintaining high ionic conductivity at room temperature (greater than about 1 mS $cm^{-1}$). Moreover, the hBN nanosheet solid matrix improves electrochemical stability at high potentials, which enables compatibility with high-voltage cathodes (greater than about 5 V vs $Li/Li^+$) such as lithium nickel manganese oxide. Furthermore, the high thermal stability of the hBN nanosheet solid matrix facilitates high-rate operation of solid-state rechargeable lithium-ion batteries at temperatures up to 175° C.

Methods of Fabrications and Characterization

Exfoliation of hBN: In the exemplar example, a dispersion containing bulk hBN microparticles (about 1 μm, Sigma-Aldrich), ethyl cellulose (EC) (4 cP viscosity grade, Sigma-Aldrich), and ethanol (Sigma-Aldrich) in an about 10:1:52 weight ratio was shear-mixed for about 2 h at about 10,230 rpm, using a rotor/stator mixer (L5M-A, Silverson) with a square hole screen. The shear-mixed dispersion was then centrifuged (J26-XPI, Beckman Coulter) at about 4,000 rpm for about 20 min to remove large particles, after which the supernatant was collected and mixed with an aqueous solution of about 0.04 g $mL^{-1}$ sodium chloride (Sigma-Aldrich) in an about 16:9 weight ratio to flocculate exfoliated hBN nanosheets and EC. After centrifuging the flocculated solution at about 7,600 rpm for about 6 min, the sedimented hBN nanosheets and EC were rinsed with deionized water to remove residual sodium chloride, dried with an infrared lamp, and grinded with a mortar and pestle to yield a powder. The hBN/EC powder was then annealed at about 400° C. for about 2 h in air to decompose EC, resulting in a thin carbon coating on the exfoliated hBN nanosheets. The hBN nanosheets were observed using a scanning electron microscope (SU8030, Hitachi) and transmission electron microscope (ARM 300F, JEOL), and their lateral size and thickness were characterized using an atomic force microscope (Asylum Research Cypher, Oxford Instruments).

Preparation of hBN Gel Electrolytes: To prepare Li-IL, 1 M lithium bis(trifluoromethanesulfonyl)imide (LiTFSI) (99.95% trace metal basis, Sigma-Aldrich) was dissolved in 1-Ethyl-3-methylimidazolium bis(trifluoromethylsulfonyl) imide (EMIM-TFSI) ($H_2O \leq 500$ ppm, Sigma-Aldrich) by stirring with a magnetic stir bar on a hotplate at about 120° C. for about 24 h. To produce gel electrolytes, the hBN nanosheets (about 33-40% by weight) and Li-IL were mixed using a mortar and pestle. The electrolytes were used after aging for longer than about 12 h. All the electrolyte preparation steps were carried out in an argon-filled glovebox.

Characterization of hBN Gel Electrolytes: In the exemplary example, to evaluate ionic conductivity, the gel electrolyte was inserted between two stainless steel disks, and its resistance (R) was measured by electrochemical impedance spectroscopy (EIS) using a potentiostat (VSP, BioLogic). EIS was performed over a frequency range from about 1 MHz to about 100 mHz and an amplitude of about 10 mV. Ionic conductivity (a) was calculated based on the following equation:

$$\sigma = \frac{t}{R \times A}$$

where t and A are the thickness and area, respectively, of the electrolyte between the stainless steel disks. Temperature-dependent measurements were executed using an environmental chamber (BTX-475, Espec) for precise temperature control. Electrochemical stability was characterized by linear sweep voltammetry (LSV) using the potentionstat. LSV was performed with a scan rate of about 1 mV $s^{-1}$ at room temperature, using stainless steel as the working electrode and lithium as both the reference and counter electrodes. Viscoelastic properties were characterized using a rheometer (MCR 302, Anton Paar) equipped with an about 25 mm diameter parallel plate (gap between the rheometer stage and parallel plate: about 1 mm) with a strain of about 0.1% at about 25° C. Thermal stability was studied using a thermogravimetric analyzer (TGA/SDTA851, Mettler Toledo) under a nitrogen atmosphere and temperature ramp rate of about 7.5° C. $min^{-1}$. Galvanostatic polarization tests were conducted using CR2032-type lithium symmetric cells at room temperature.

Graphene Preparation: To prepare graphene for Gr-LFP electrodes, a dispersion of graphite (Sigma-Aldrich), EC, and ethanol in an about 30:1:20 weight ratio was shear-mixed for 23 h, using an inline mixer (200 L, Silverson) equipped with a square hole screen. The shear-mixed dispersion was centrifuged at about 6,500 rpm for about 30 min to crash out unexfoliated graphite, and the supernatant containing exfoliated graphene and EC was then collected and flocculated with an aqueous solution of about 0.04 g $mL^{-1}$ sodium chloride in an about 16:9 weight ratio. After centrifuging the mixture at about 7,000 rpm for about 7 min, the sedimented solids comprised of graphene and EC were collected from the bottles and washed with deionized water to remove residual sodium chloride, dried with an infrared lamp, and grinded with a mortar and pestle to yield a powder.

Electrode Preparation: To prepare LTO, LFP, and LNMO electrodes, a slurry of active materials (LTO from Sigma-Aldrich, LFP and LNMO from MTI Corporation), carbon black (Alfa Aesar), and PVDF (MTI Corporation) in an about 8:1:1 weight ratio in 1-methyl-2-pyrrolidinone (NMP, Sigma-Aldrich) was coated on aluminum substrates. The electrodes were used after drying in a vacuum oven at about 80° C. for longer than about 24 h. NMC electrodes sheets were obtained from Sigma-Aldrich, and used as received. To prepare Gr-LFP electrodes, a slurry of LFP, graphene, and EC in an about 45:5:6 weight ratio in NMP was coated on aluminum substrates. The electrodes were used after annealing at about 320° C. for 1 h in argon to remove EC. Active material loading of the electrodes was about 2-5 mg $cm^{-2}$.

Battery Testing: Electrodes were cut into circles with a diameter of about 1 cm. To improve the interfacial contact between the electrode and gel electrolyte, a small amount (about 10 mg) of Li-IL was drop-cast onto the electrode, and the excess on the electrode surface was removed with a Kimtech wipe. The hBN gel electrolyte (about 200 mg) was then manually deposited onto the electrode using a spatula, and a counter electrode was placed on the gel electrolyte. Using the stacked electrodes and electrolyte, CR2032-type coin cells were fabricated for testing at room temperature, and split test cells (MTI Corporation) with polytetrafluoroethylene O-rings were assembled for testing at about 175° C. The gel electrolyte thickness measured after disassembling the cells was 200-250 µm. Control cells with the Li-IL electrolyte were prepared using a glass microfiber filter (GF/C grade, Whatman) as a separator. All battery cells were assembled in an argon-filled glovebox and measured with a battery testing system (BT-2143, Arbin).

Exfoliated hBN and Gel Electrolyte

Figure 7:
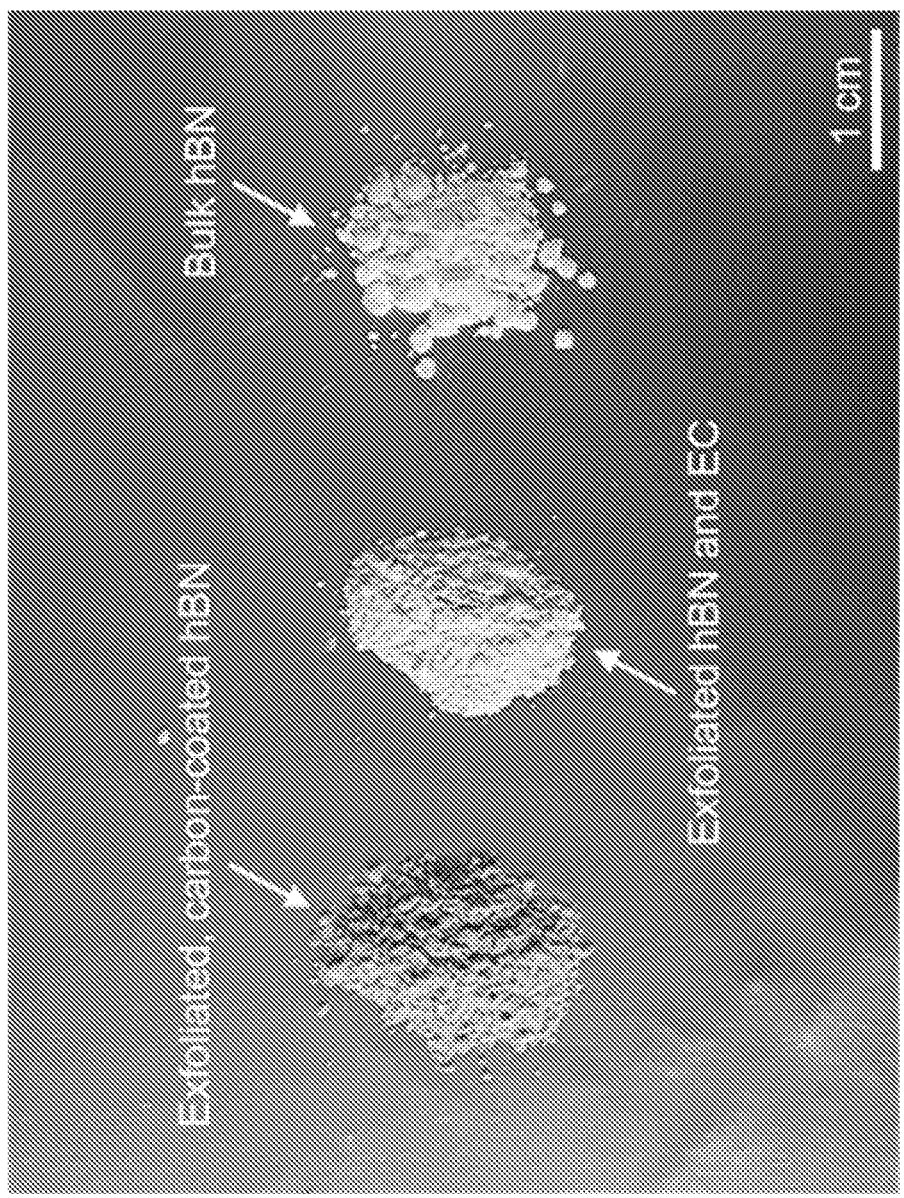
FIG. 7 shows a photograph of hexagonal boron nitride (hBN) nanosheets according to embodiments of the invention. While the bulk hBN microparticles (right) and the exfoliated hBN/EC (middle) are white, the exfoliated hBN nanosheets (left) after annealing at about 400° C. for about 2 h are gray due to the carbon coating on the surface of the hBN nanosheets.
Figure 8B:
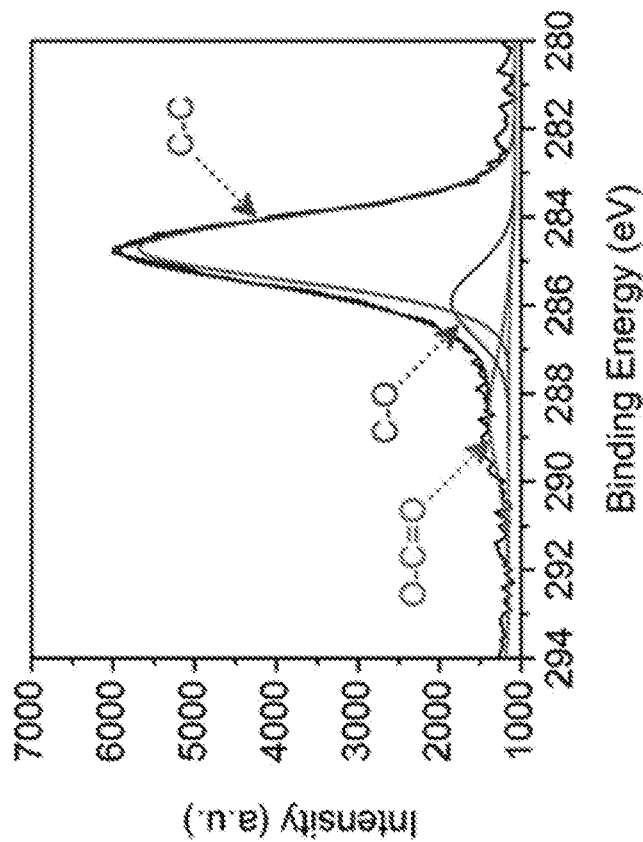
FIGS. 8A-8B shows X-ray photoelectron spectroscopy (XPS) of exfoliated, carbon-coated hBN nanosheets according to embodiments of the invention.
Figure 8A:
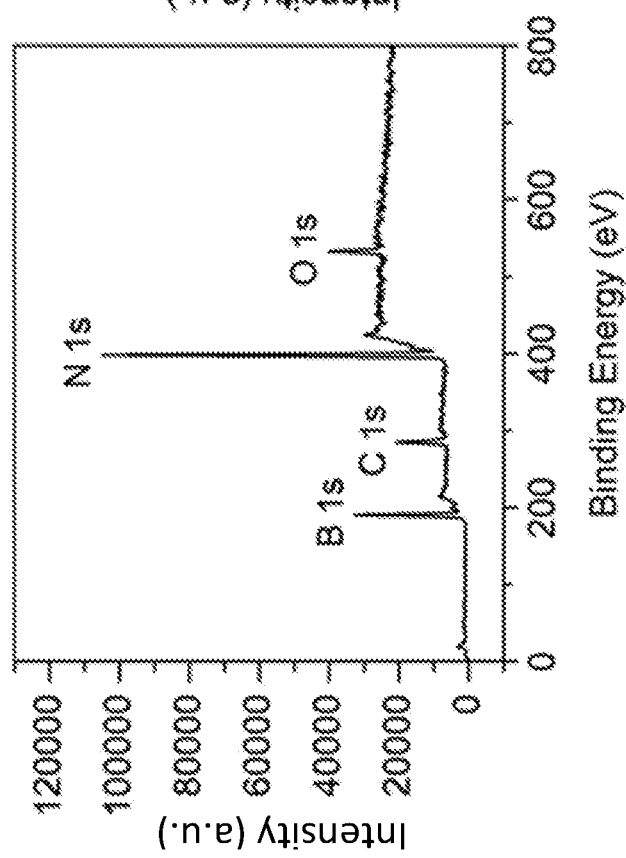
Figure 9B:
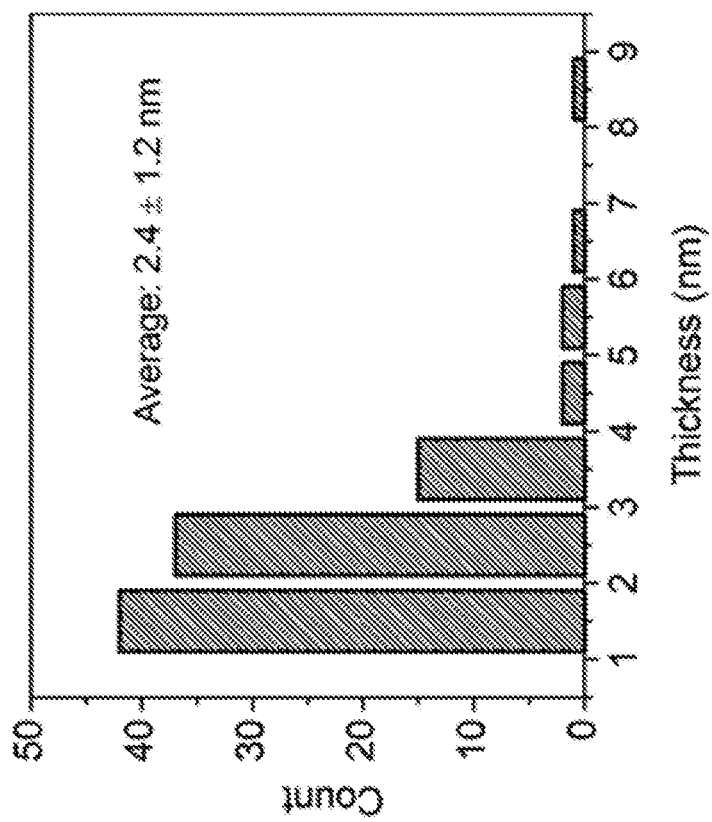
FIGS. 9A-9B show dimensions of exfoliated, carbon-coated hBN nanosheets according to embodiments of the invention.
Figure 9A:
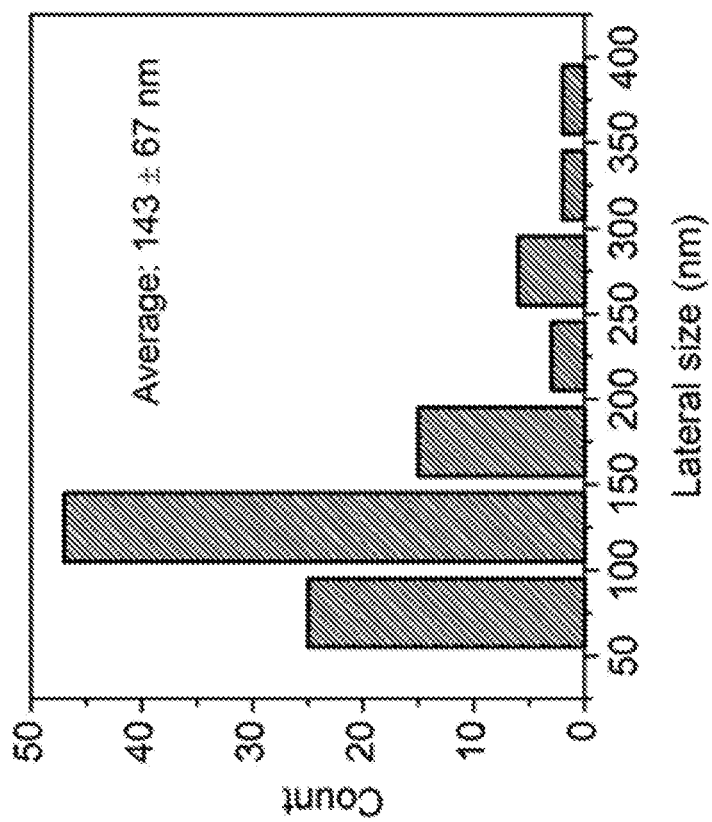

FIG. 1A depicts a schematic of the preparation of ionic liquid gel electrolytes with exfoliated hBN nanosheets. The hBN nanosheets shown in FIG. 1B are isolated from bulk hBN microparticles (about 1 µm particle diameter) by shear mixing with EC in ethanol. EC is included in the hBN/ethanol dispersion to stabilize the exfoliated hBN nanosheets during shear mixing and thereby improve the yield of liquid-phase exfoliation. The exfoliated hBN nanosheets and EC are subsequently collected from the shear-mixed dispersion by flocculation and centrifugation, followed by annealing at about 400° C. for about 2 h to decompose the EC polymer. This annealing process volatilizes most of the EC, but also leaves behind a thin amorphous carbon coating on the surface of the exfoliated hBN nanosheets, as shown by the dark band at the edge of the hBN nanosheet in the transmission electron microscopy (TEM) image of FIG. 1C. Additionally, due to the amorphous carbon coating, the white hBN nanosheet powder shown in FIG. 7 appears visibly gray after annealing, with X-ray photoelectron spectroscopy (XPS) shown in FIGS. 8A-8B confirming the presence of carbon on the hBN nanosheet surfaces. Using atomic force microscopy (AFM), the average lateral size and thickness shown in FIGS. 9A-9B of the exfoliated hBN nanosheets are 143±67 nm and 2.4±1.2 nm, respectively.

Figure 10:
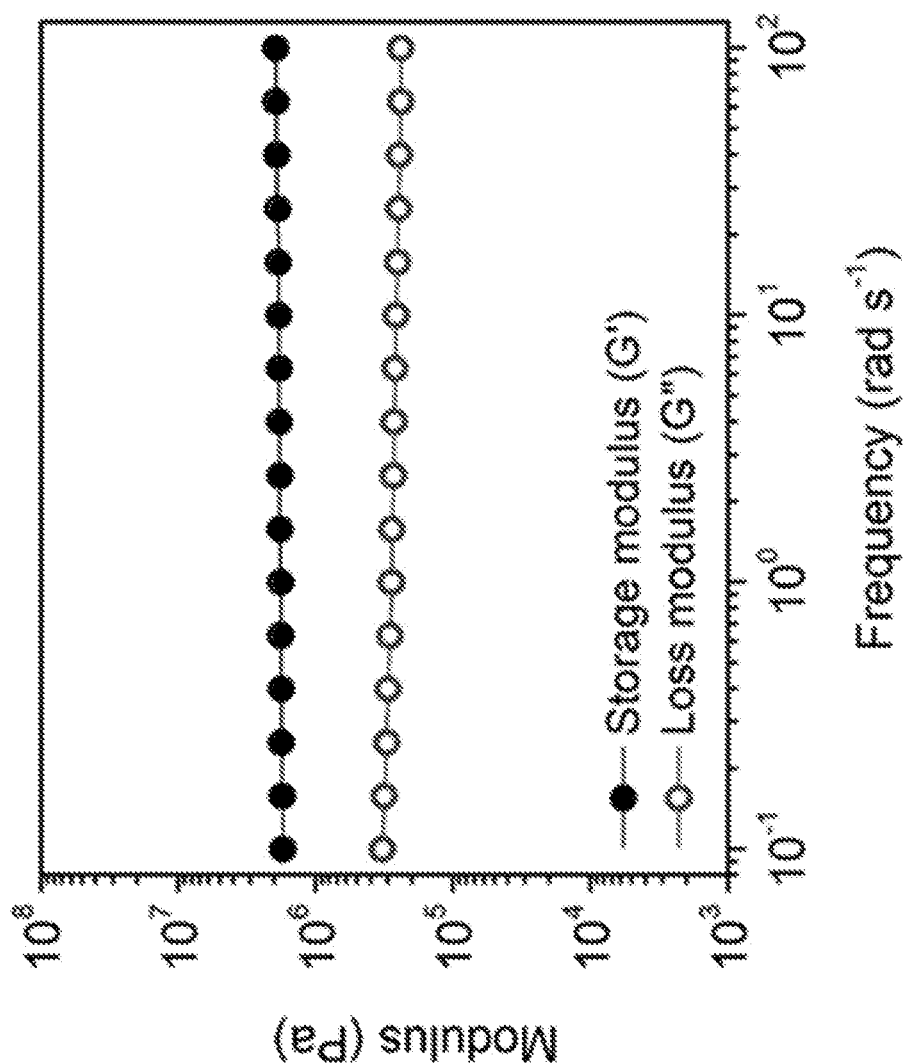
FIG. 10 shows viscoelastic properties according to embodiments of the invention. The hBN gel electrolyte (about 33% exfoliated, carbon-coated hBN nanosheets) shows storage (G') modulus higher than loss (G") modulus without significant dependence on frequency, revealing the strong solidification of the electrolyte.

The hBN gel electrolytes are produced by mixing the exfoliated, carbon-coated hBN nanosheets (about 33-40% by weight) and a lithium ionic liquid (Li-IL), 1-ethyl-3-methylimidazolium bis(trifluoromethylsulfonyl)imide (EMIM-TFSI) containing 1 M lithium bis(trifluoromethylsulfonyl)imide (LiTFSI) salt. The solidification of the gel electrolytes can be observed by the lack of movement of the electrolytes from the bottom of the vial even after it is flipped over, as shown in FIG. 1D. Quantitatively, the gel electrolytes exhibit a storage modulus (G') that is higher than its loss modulus (G") with minimal frequency dependence, as shown in FIG. 10, revealing reliable solid-like behavior. The uniform mixture of the hBN nanosheets and Li-IL is verified with scanning electron microscopy (SEM), as shown in FIG. 1E.

Mechanical Properties and Ionic Conductivity

Figure 2A:
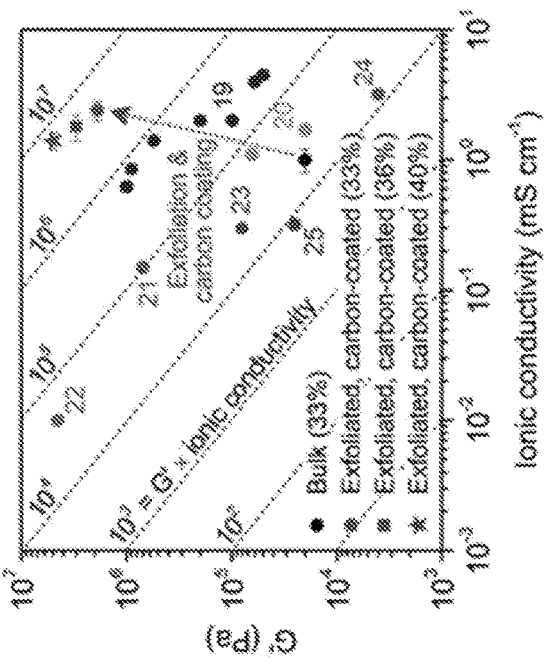
FIGS. 2A-2D show mechanical modulus, ionic conductivity, and polarization tests according to embodiments of the invention.
Figure 2B:
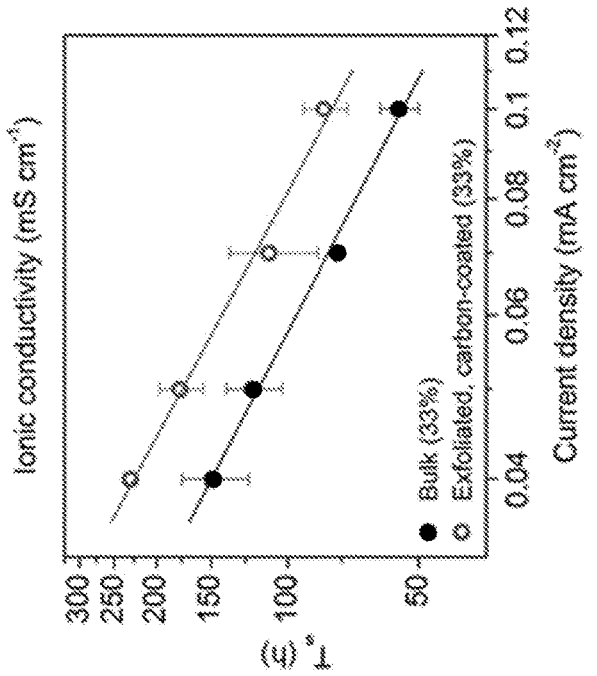
Figures 11A, 11B:
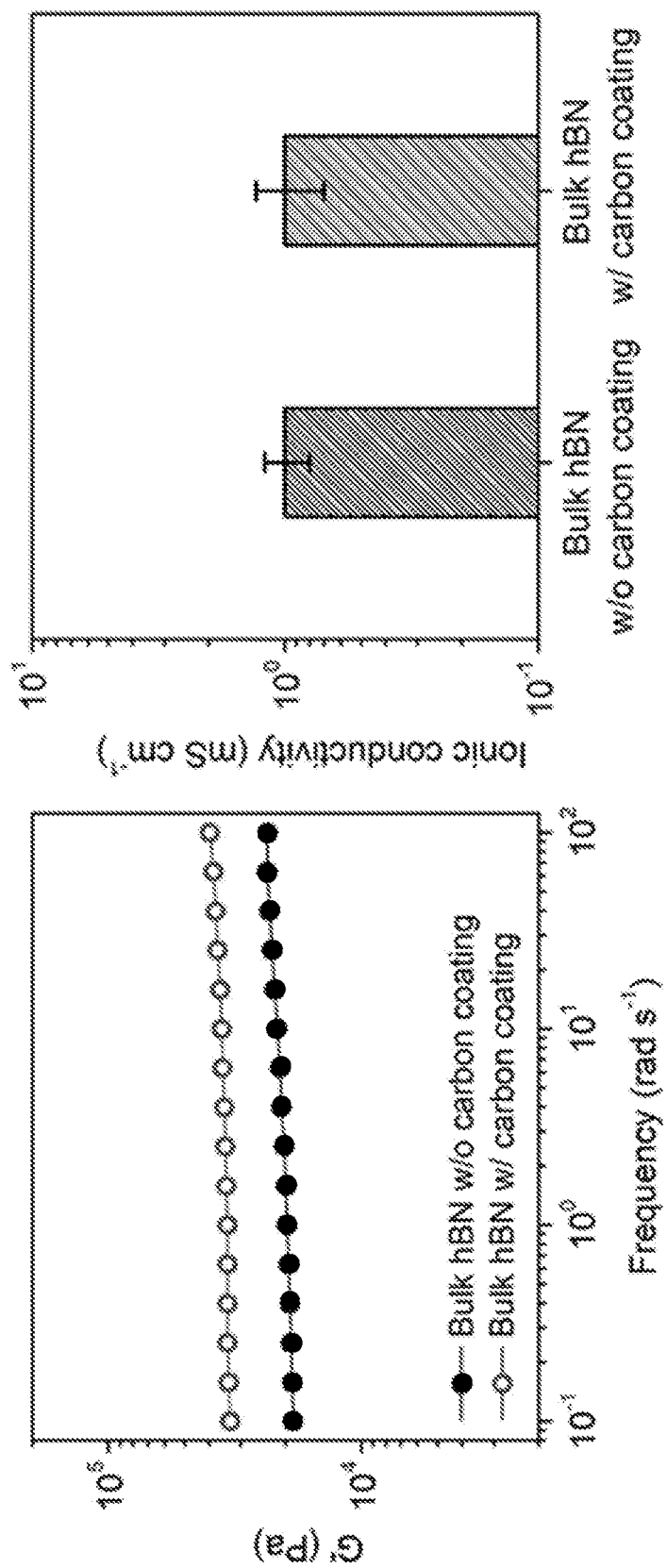
FIGS. 11A-11B shows effects of carbon coating on ionic conductivity and mechanical modulus according to embodiments of the invention.

To investigate the influence of the exfoliation and carbon coating of hBN on mechanical properties, storage moduli (G') of the gel electrolytes formulated using the exfoliated, carbon-coated hBN nanosheets and the bulk hBN microparticles are compared, as shown in FIG. 2A. The exfoliated, carbon-coated hBN gel electrolyte presents a storage modulus that is two orders of magnitude higher than that of the bulk hBN gel electrolyte at the same solid loading. These enhanced mechanical properties can be primarily attributed to the smaller size of the exfoliated hBN nanosheets, which induces stronger gelation than the bulk hBN microparticles. Another contribution to the improved mechanical properties arises from the amorphous carbon coating on the hBN surface, which can be identified by comparing gel electrolytes prepared with pristine and carbon-coated bulk hBN microparticles, as shown in FIGS. 11A-11B. Therefore, it is apparent that EC not only improves the liquid-phase exfoliation yield, but also enhances the mechanical properties of the gel electrolytes via its amorphous carbon coating following annealing. Importantly, the significant enhancement of the mechanical modulus occurs without compromising ionic conductivity, as shown in FIG. 2B. This minimal tradeoff between mechanical properties and ionic conductivity can be attributed to the nanoscale size of exfoliated hBN, which leads to stronger gelation without significantly disrupting ionically conductive pathways in the gel electrolytes. Overall, the ionic liquid gel electrolytes based on exfoliated, carbon-coated hBN nanosheets possess exceptional mechanical properties (G' as high as about 5 MPa) with high ionic conductivities at room temperature (greater than about 1 mS cm$^{-1}$) that outperform all other ionic liquid gel electrolytes previously reported for rechargeable lithium-ion batteries, as shown in FIG. 2B.

Figure 2C:
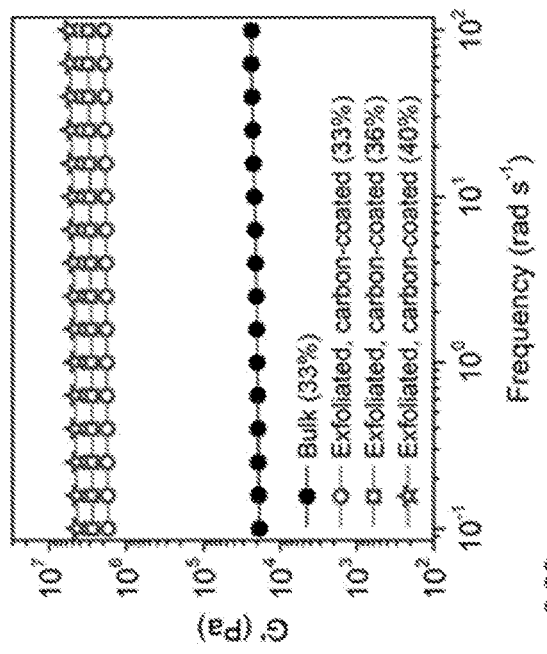
Figure 2D:
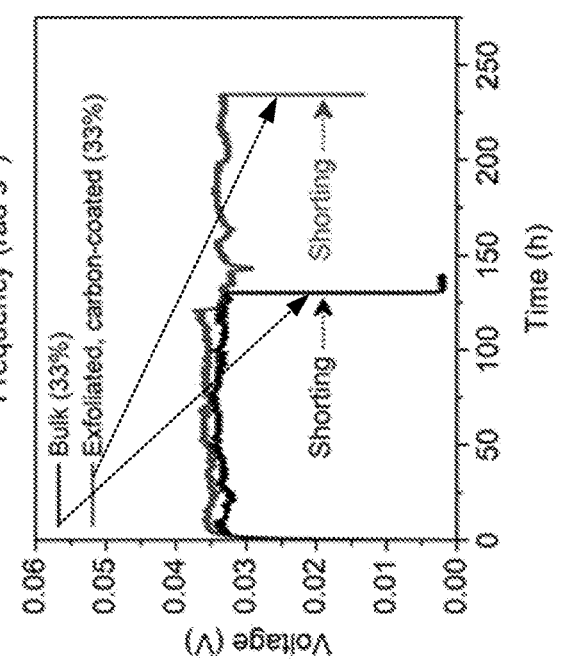

The large mechanical modulus is also valuable for strengthening the resistance of the gel electrolytes to lithium dendrite growth for lithium metal batteries. To confirm the enhanced suppression of lithium dendrite growth, galvanostatic polarization tests were performed using lithium symmetric cells. In this polarization method, a fixed current density is applied to lithium symmetric cells (Li|electrolyte|Li) to induce lithium dendritic growth, and the cell voltage is measured as a function of time until the appearance of a sudden voltage drop that occurs upon electrode shorting. FIG. 2C compares the typical voltage profiles for the polarization of lithium symmetric cells containing gel electrolytes prepared with bulk hBN microparticles and exfoliated, carbon-coated hBN nanosheets. At the same current density, the two samples display similar voltage levels, but the exfoliated hBN gel electrolyte exhibits a longer time ($T_s$) preceding electrode shorting than the bulk hBN gel electrolyte, thus indicating more effective suppression of lithium dendrite growth. As the current density increases, as shown in FIG. 2D, $T_s$ decreases due to faster lithium ion movement, but the exfoliated hBN gel electrolyte consistently exhibits longer $T_s$ than the bulk hBN gel electrolyte. Considering their similar ionic conductivities, the longer $T_s$ of the exfoliated hBN gel electrolyte can be attributed to its enhanced mechanical modulus hindering lithium dendrite growth.

Electrochemical Stability for Rechargeable Lithium-Ion Batteries

Figure 3A:
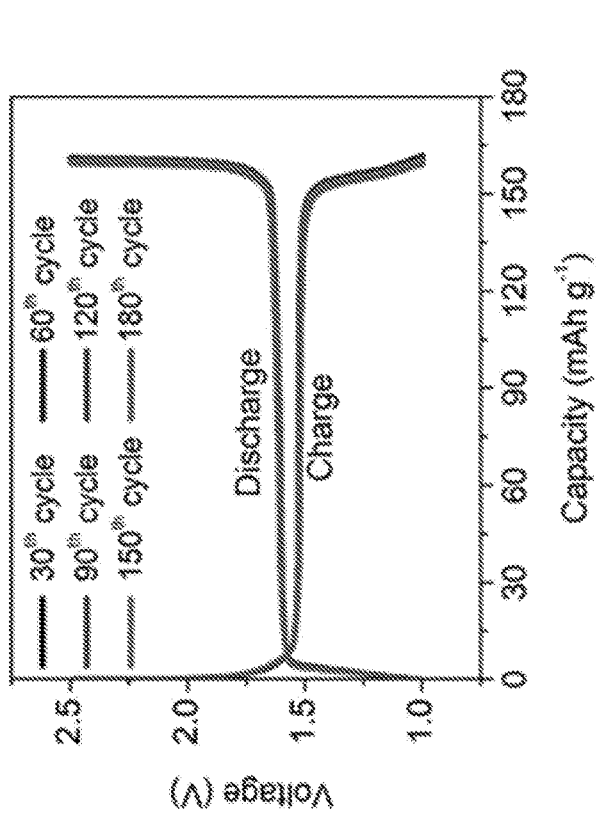
FIGS. 3A-3C show battery configuration and long-term stability according to embodiments of the invention.
Figure 3B:
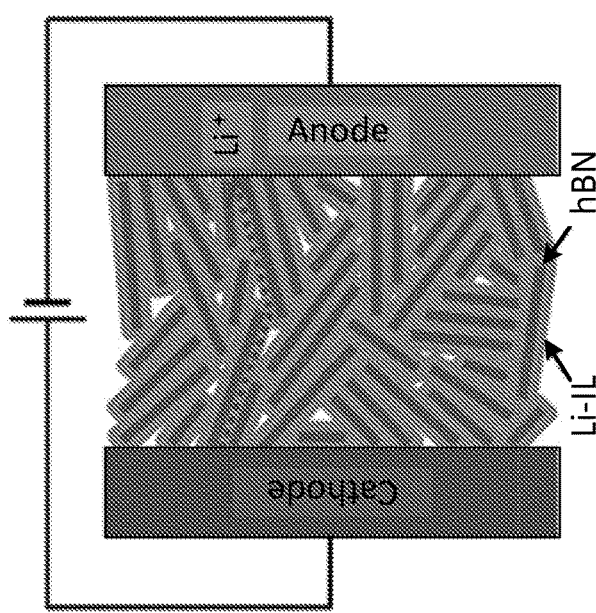
Figure 3C:
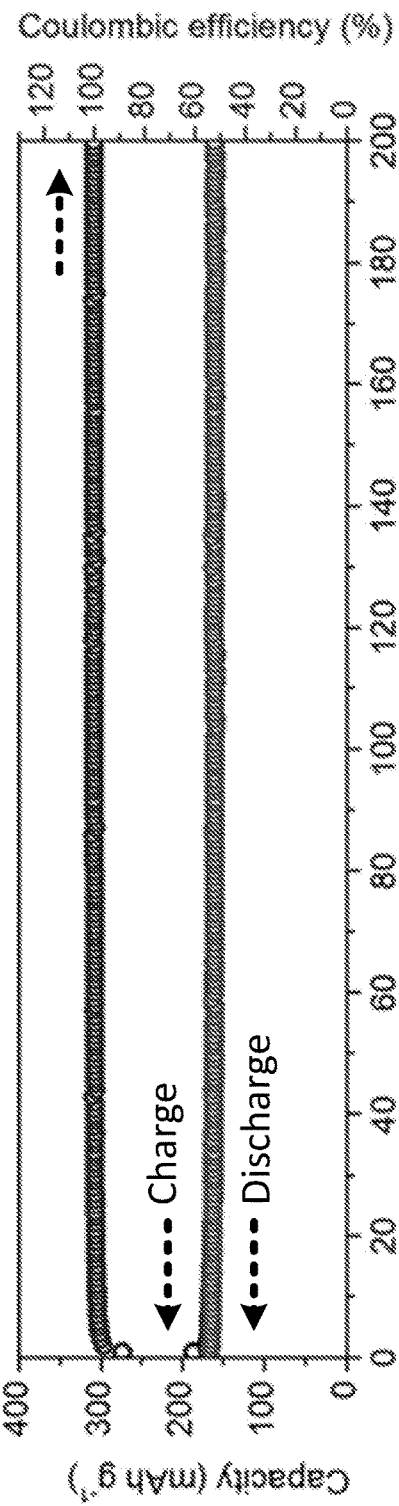

FIG. 3A depicts a schematic of a lithium-ion battery that employs the exfoliated hBN gel electrolyte. The hBN nanosheets serve as the solid framework component of the gel electrolyte that enables battery assembly without a separator between the anode and cathode. The Li-IL adsorbed to the surface of the hBN nanosheets facilitates lithium ion transport between the two electrodes for battery operation. Rechargeable lithium-ion batteries based on the exfoliated hBN gel electrolyte (about 40% hBN nanosheets) were first fabricated using lithium titanium oxide ($Li_4Ti_5O_{12}$, LTO) and lithium metal electrodes. FIGS. 3B-3C display the charge-discharge voltage profiles and cycling performance, respectively, of the LTO|hBN gel|Li cell tested at 0.1 C. The voltage profiles show well-defined plateaus, which indicate effective electrochemical operation using the hBN gel electrolyte. Moreover, the cell retains about 96% of its initial gravimetric discharge capacity (first cycle: about 165 mAh g$^{-1}$; 200th cycle: about 159 mAh g$^{-1}$) and possesses a coulombic efficiency greater than 99% with negligible change in the voltage profiles over about 200 cycles (greater than 6 months), revealing the long-term stability of the hBN gel electrolytes for rechargeable lithium-ion batteries.

Figure 4A:
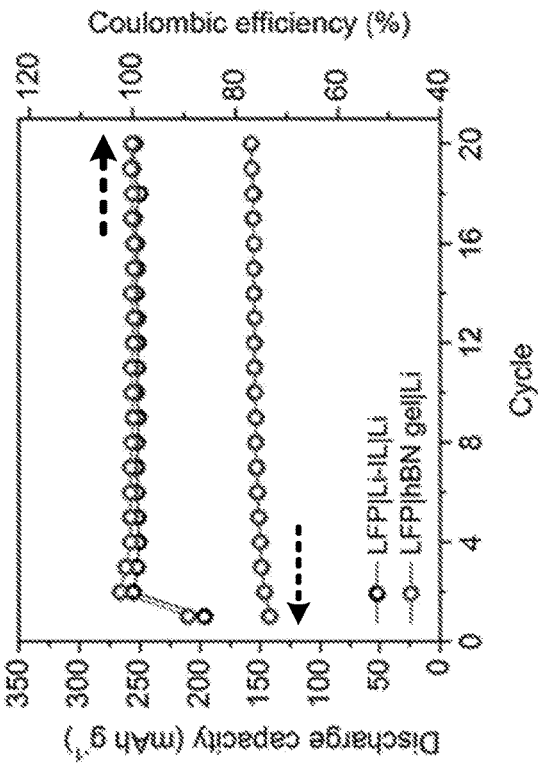
FIGS. 4A-4D show electrochemical stability for rechargeable lithium-ion batteries according to embodiments of the invention.
Figure 4C:
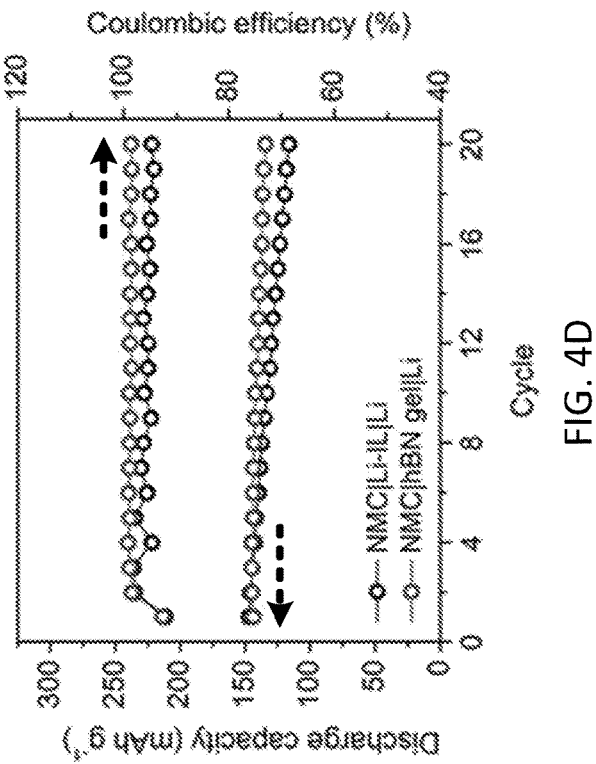
Figure 4B:
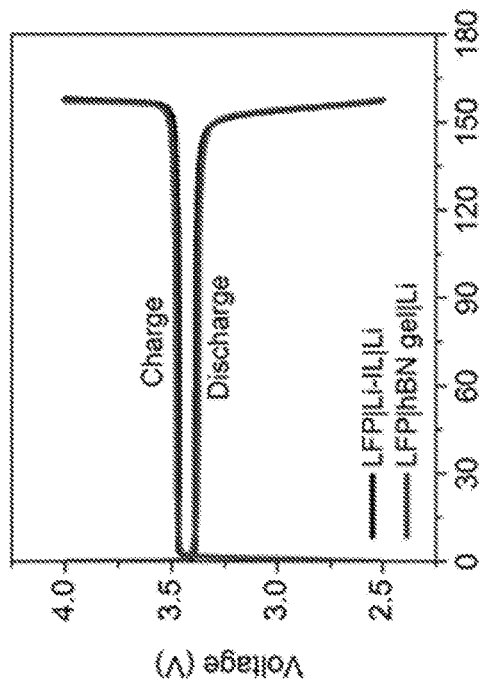
Figure 4D:
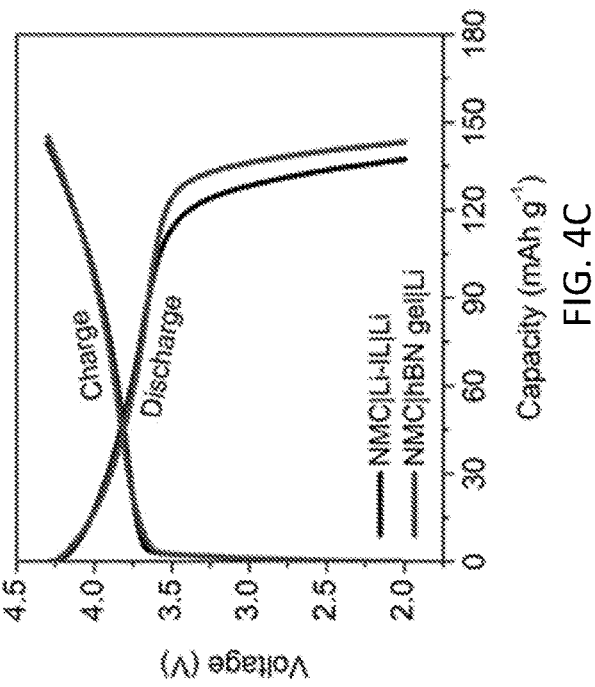

To further investigate the electrochemical stability of the hBN gel electrolytes, battery cells were tested employing different cathodes paired with a lithium metal anode (cathode|hBN gel|Li). Control cells were also fabricated using bulk Li-IL as an electrolyte (cathode|Li-IL|Li) with a separator to compare the electrochemical performance with and without the hBN nanosheets. FIG. 4A displays the typical charge-discharge voltage profiles of the battery cells using a lithium iron phosphate (LiFePO$_4$, LFP) cathode at 0.1 C. The LFP|hBN gel|Li cell shows desirable voltage profiles and gravimetric discharge capacity higher than about 150 mAh g$^{-1}$ with a columbic efficiency greater than 99% after the first few initial cycles, as shown in FIG. 4B, which is similar to the behavior of the control cell (LFP|Li-IL|Li). In addition, for lithium nickel manganese cobalt oxide (LiNi$_{0.33}$Mn$_{0.33}$Co$_{0.33}$O$_2$, NMC) cathodes operating at higher voltages (charge cutoff voltages for LFP and NMC are about 4.0 V and about 4.3 V vs Li/Li$^+$, respectively), enhanced electrochemical performance is observed with the hBN gel electrolyte, as shown in FIGS. 4C-4D. The NMC|hBN gel|Li cell possesses a similar initial gravimetric discharge capacity of about 144 mAh g$^{-1}$ as the control cell (NMC|Li-IL|Li), but subsequently exhibits higher discharge capacity and coulombic efficiency after the few initial cycles.

Figure 5A:
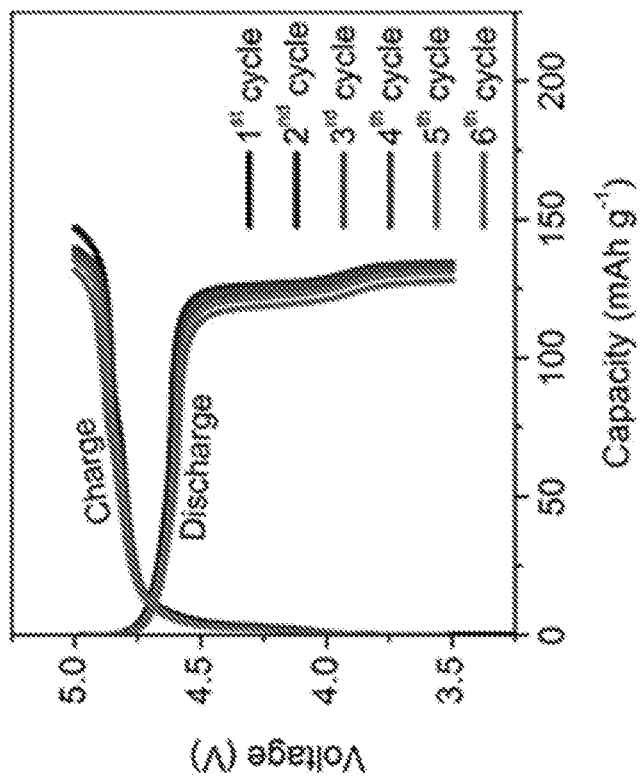
FIGS. 5A-5D show high-voltage lithium-ion batteries according to embodiments of the invention.
Figure 5B:
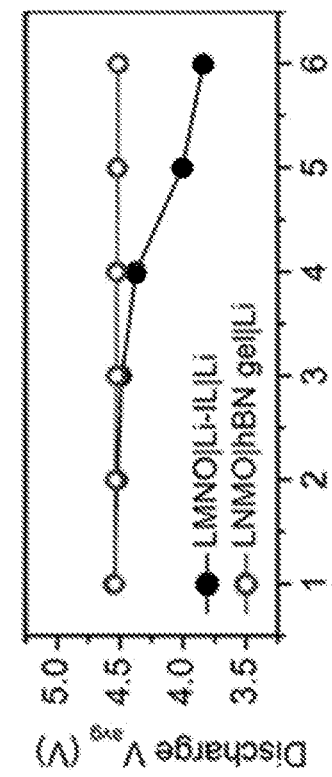
Figure 5C:
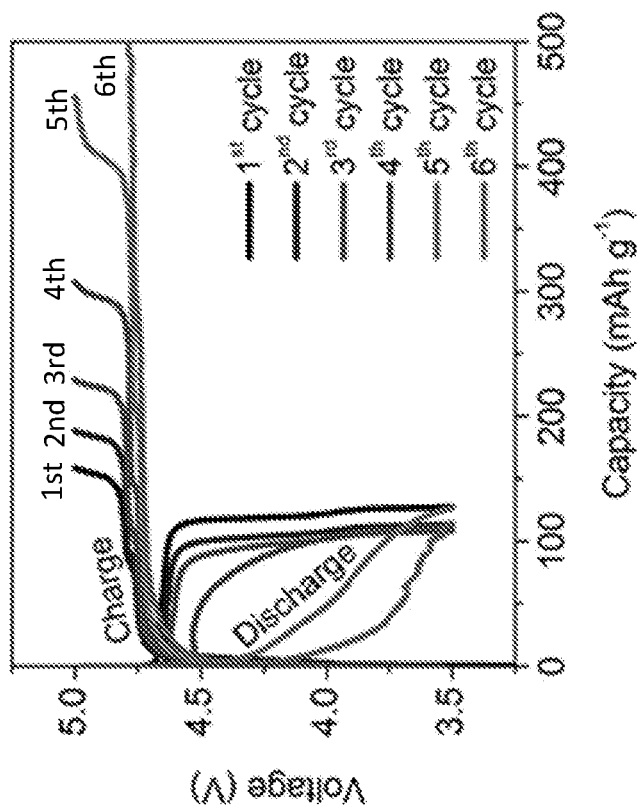
Figure 5D:
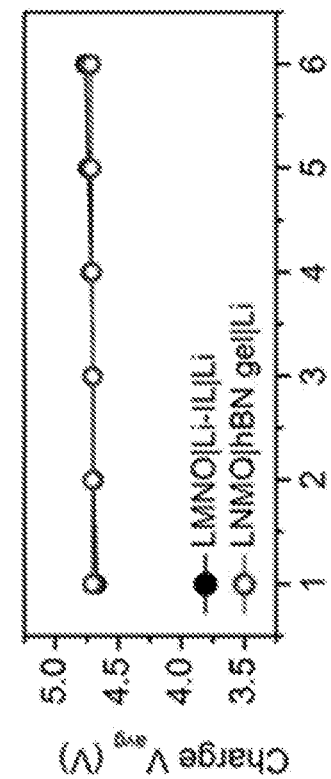
Figure 12:
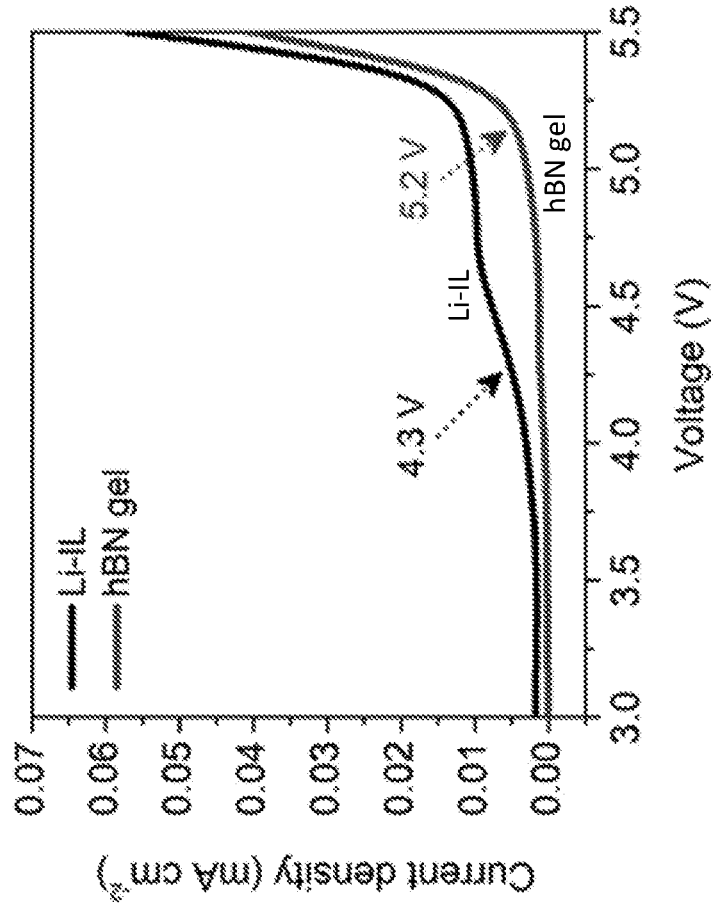
FIG. 12 shows linear sweep voltammetry (LSV) according to embodiments of the invention. The bulk Li-IL electrolyte shows a current density rise at about 4.3 V (vs Li/Li$^+$), corresponding to oxidation of IL cations. In contrast, the hBN gel electrolyte is stable up to about 5.3 V (vs Li/Li$^+$) without the decomposition peak. The LSV measurements were performed using stainless steel as the working electrode and lithium as both the reference and counter electrodes, with a scan rate of about 1 mV s$^{-1}$ at room temperature.

The improved electrochemical performance with the hBN gel electrolyte can likely be attributed to the adsorption of Li-IL on the large surface area of the hBN nano sheets, which stabilizes the Li-IL at high voltages. The enhanced electrochemical stability of the hBN gel electrolyte at high voltages is supported by linear sweep voltammetry (LSV) measurements, as shown in FIG. 12. The LSV curve of the bulk Li-IL electrolyte reveals a decomposition peak at about 4.3 V (vs Li/Li$^+$) corresponding to the oxidation of EMIM cations, which is consistent with the degradation of the NMC|Li-IL|Li cell. In contrast, the LSV curve of the hBN gel electrolyte shows suppression of the decomposition peak and extended electrochemical stability up to about 5.3 V (vs Li/Li$^+$), suggesting that the hBN gel electrolyte can be utilized with even higher voltage cathodes. Towards this end, the hBN gel electrolyte was incorporated into cells based on lithium nickel manganese oxide (LiNi$_{0.5}$Mn$_{1.5}$O$_4$, LNMO) cathodes operating at a charge cutoff voltage of about 5 V (vs Li/Li+). While the control cell (LNMO|Li-IL|Li, FIG. 5A) shows considerable degradation, the LNMO|hBN gel|Li cell (FIG. 5B) exhibits stable operation with an initial gravimetric discharge capacity of about 134 mAh g$^{-1}$ and minimal changes in the charge (FIG. 5C) and discharge (FIG. 5D) voltages upon cycling. It is thus apparent that the hBN nanosheets enhance the electrochemical stability of ionic liquid gel electrolytes, particularly for high-voltage lithium-ion batteries.

High-Temperature and High-Rate Battery Operation

Figure 13:
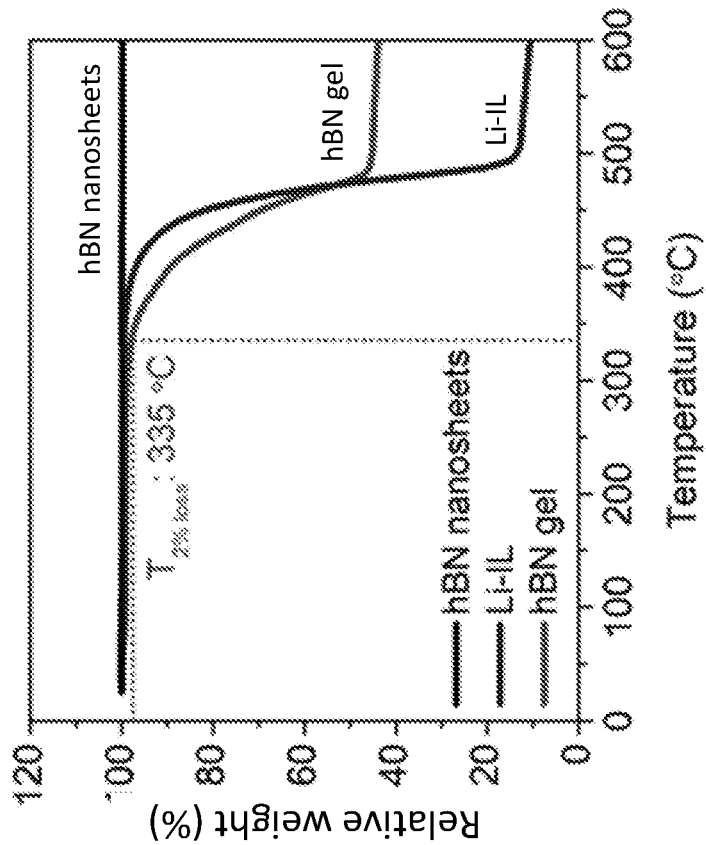
FIG. 13 shows thermogravimetric analysis (TGA) according to embodiments of the invention. The TGA curves show the relative weight (measured weight/initial weight) of the hBN nanosheets, Li-IL, and hBN gel electrolytes, from room temperature to about 600° C. hBN nanosheets do not exhibit any weight loss, and Li-IL only begins to degrade at temperatures higher than about 300° C. The hBN gel electrolyte shows about 2% weight loss ($T_{2\% \, loss}$) at about 335° C., which is associated with the degradation of Li-IL.
Figure 14:
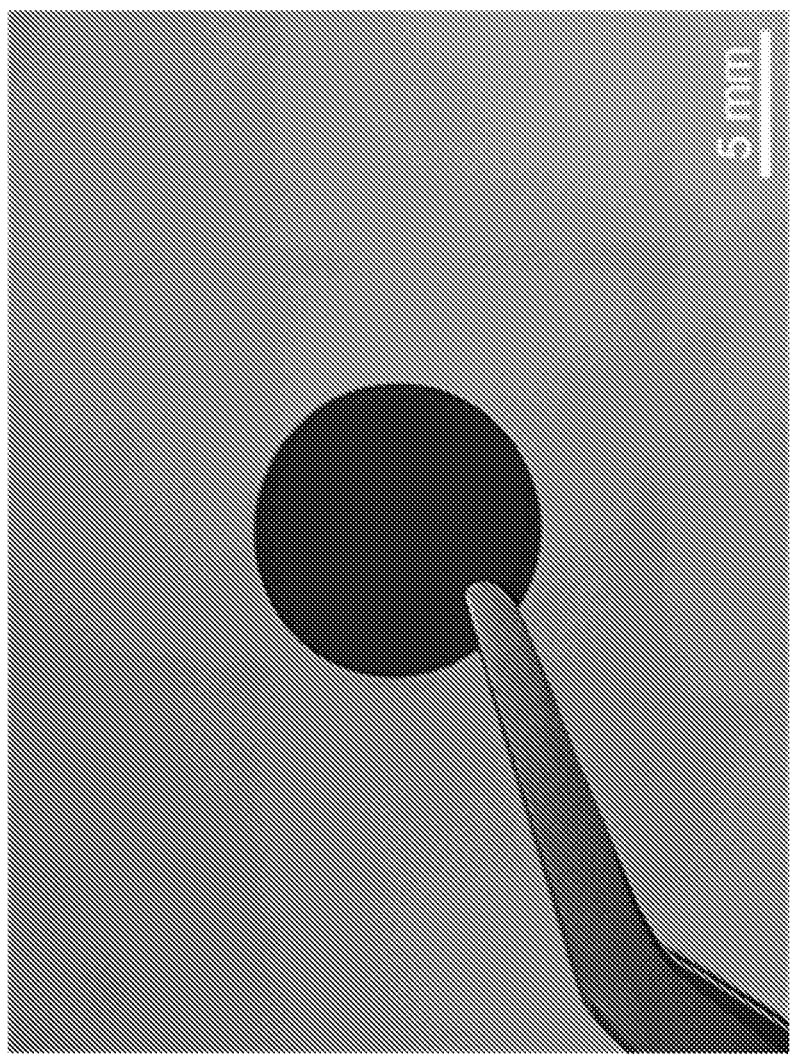
FIG. 14 shows a photograph of a binder-free, graphene/LFP (Gr-LFP) electrode according to embodiments of the invention. The Gr-LFP electrode contains LFP active materials and graphene conductive additives in an about 9:1 weight ratio on an aluminum substrate.

The thermal stability of the hBN solid matrix and Li-IL implies that hBN gel electrolytes are stable at high temperatures in excess of about 300° C. as determined by thermogravimetric analysis (TGA, FIG. 13). When coupled with the nonflammability and negligible vapor pressure of the Li-IL, this thermal stability suggests that hBN gel electrolytes are promising for rechargeable lithium-ion batteries in high-temperature applications such as heat-sterilizable medical devices, thermal reactors, and aerospace technologies. To verify the potential for high-temperature operation, the hBN gel electrolytes were tested using a binder-free cathode, which is composed of LFP active materials and graphene conductive additives (Gr-LFP), and a lithium metal anode. LFP was selected over other cathode materials because of its exceptional structural stability at elevated temperatures. In addition, the LFP electrode was prepared without a binder because conventional polyvinylidene fluoride (PVDF) binders limit the battery operating temperature to the melting point of PVDF (about 165° C.). Meanwhile, the graphene conductive additive provides high electrical conductivity for favorable charge transport in addition to increased cohesion among the LFP active particles, thereby enabling a mechanically stable electrode film in the absence of a binder, as shown in FIG. 14.

Figures 6A, 6B:
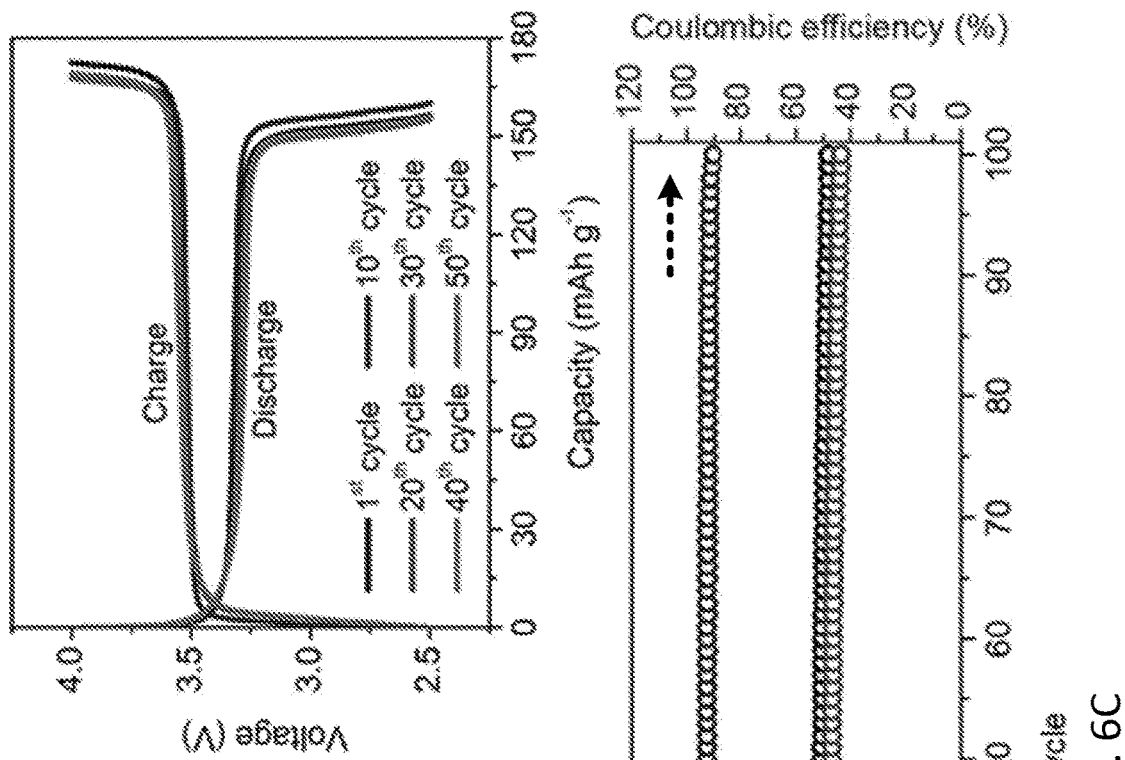
FIGS. 6A-6C show high-temperature battery operation according to embodiments of the invention.
Figures 15A, 15B:
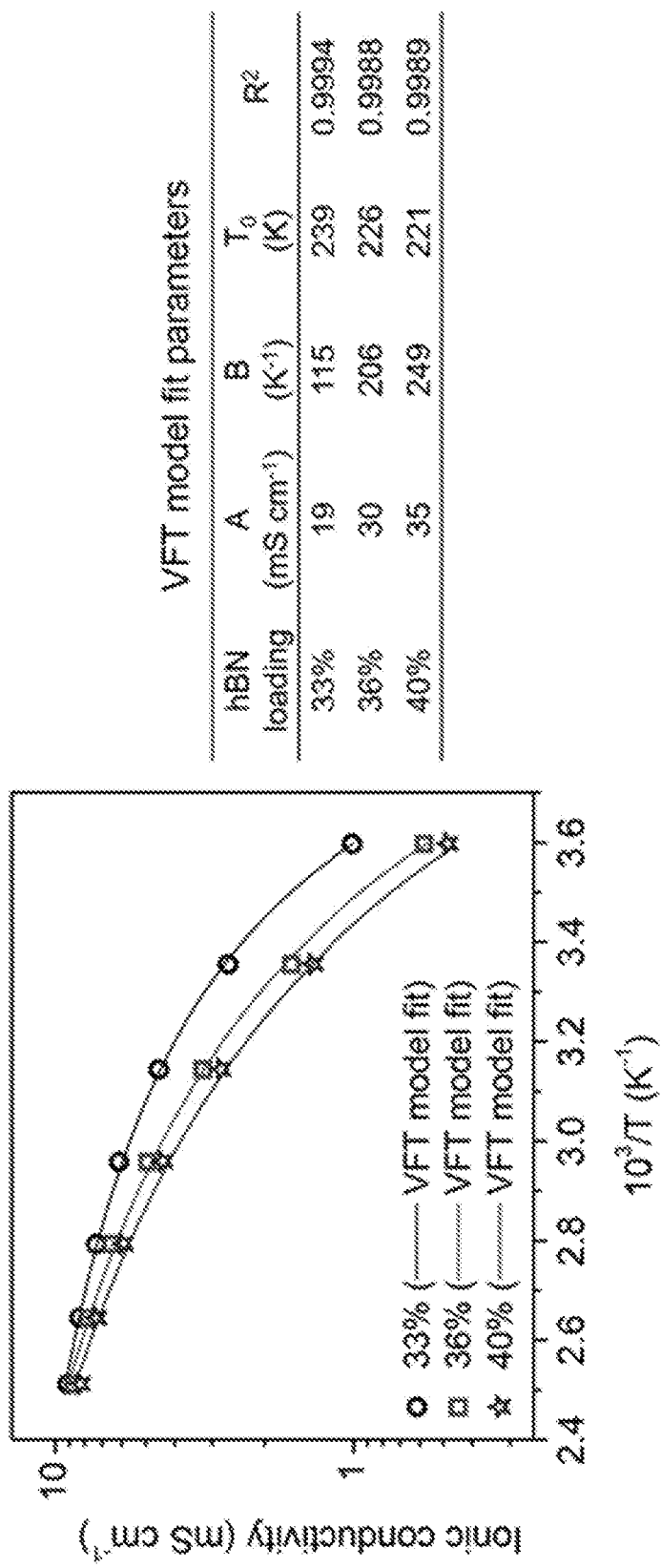
FIGS. 15A-15B show temperature dependence of ionic conductivity according to embodiments of the invention.

FIG. 6A shows the charge-discharge voltage profiles of the Gr-LFP|hBN gel|Li cell at room temperature and about 175° C. At room temperature, the cell exhibits a gravimetric discharge capacity of about 150 mAh g$^{-1}$ at 0.1 C, but the capacity decreases to about 9 mAh g$^{-1}$ at 4 C. Limited capacity at high C-rates is often observed for solid-state electrolytes due to their relatively low ionic conductances compared to liquid electrolytes. In contrast, when the Gr-LFP|hBN gel|Li cell is operated at about 175° C., the gravimetric discharge capacity increases to about 160 mAh g$^{-1}$ at 4 C, which originates primarily from the enhanced ionic conductivity of the hBN gel electrolyte at elevated temperatures. As shown in FIGS. 15A-15B, the ionic conductivity of the hBN gel electrolyte increases with temperature in agreement with the Vogel-Fulcher-Tammann model that correlates the ion conduction behavior with free volume and configurational entropy. Elevated temperatures also improve lithium diffusion in LFP and charge transfer at the electrolyte/electrode interface, further enhancing high-temperature battery performance.

Figure 6C:
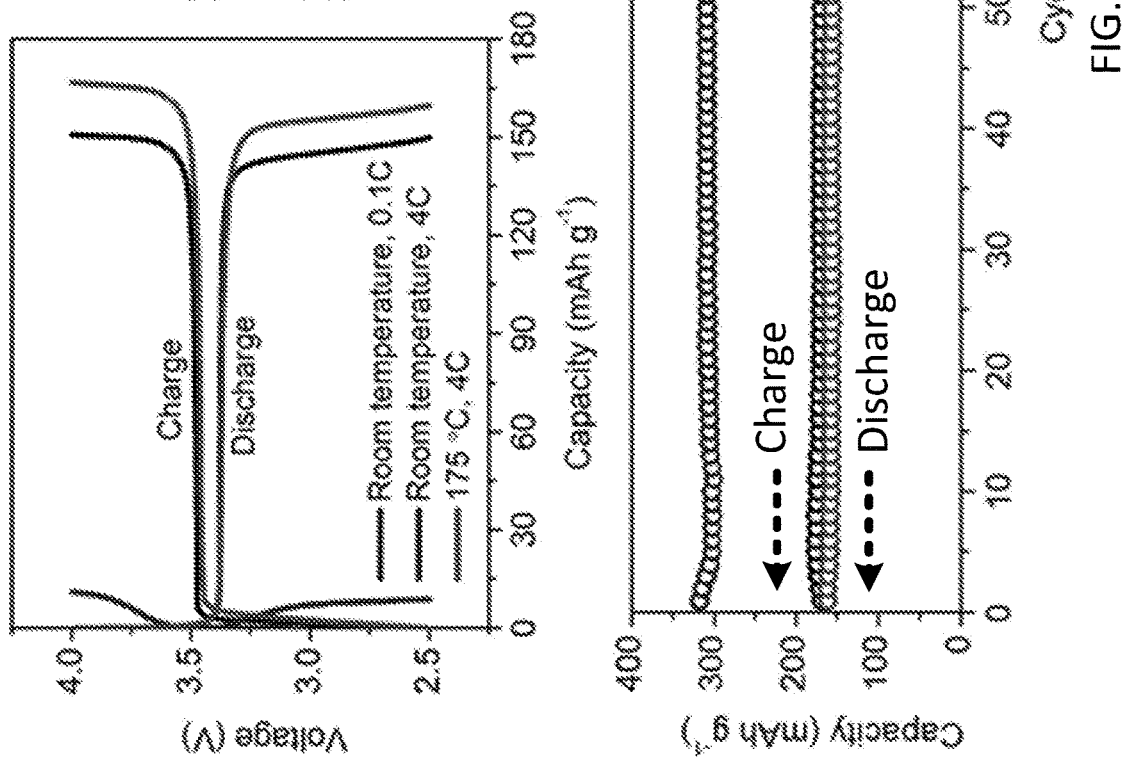
Figure 16:
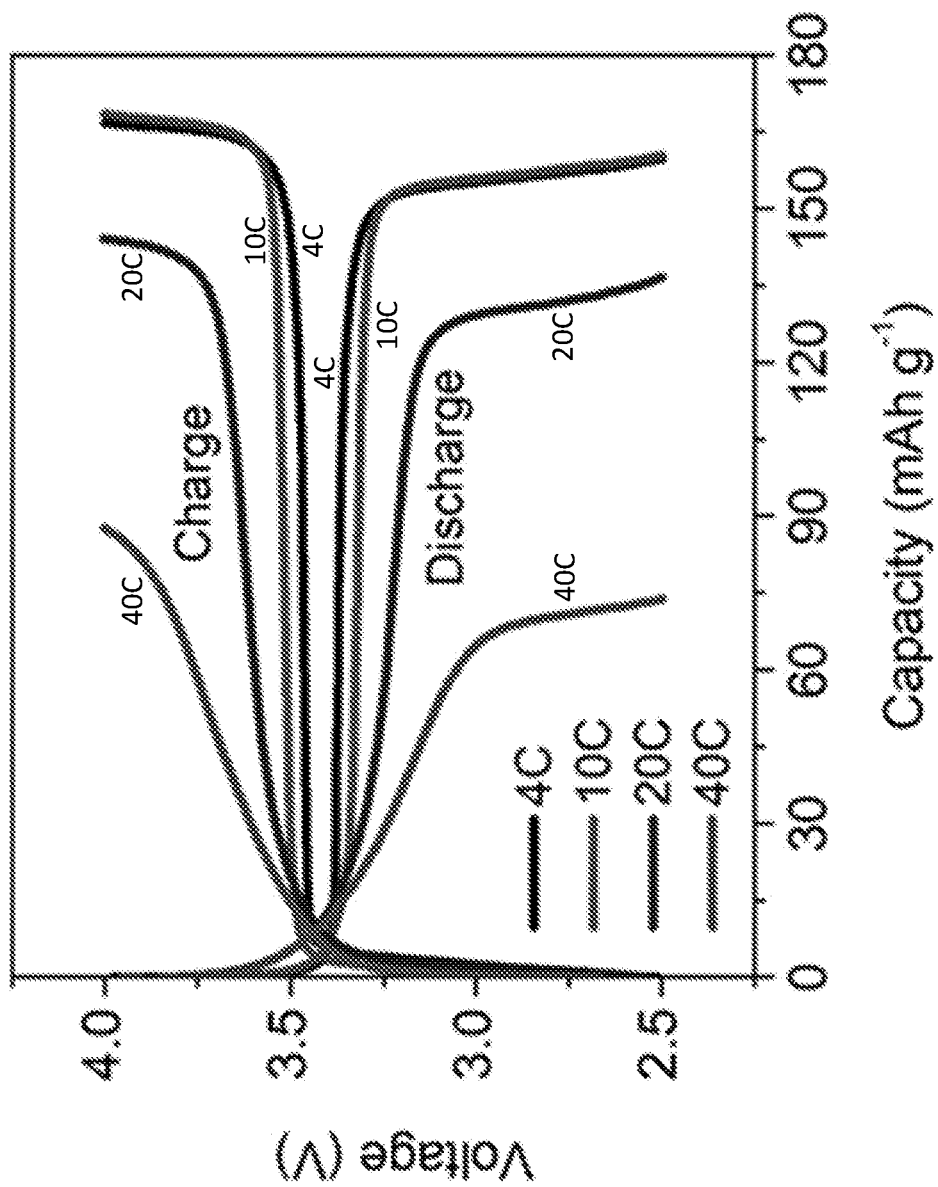
FIG. 16 shows charge-discharge voltage profiles at high C-rates at about 175° C. according to embodiments of the invention. At a higher C-rate, the Gr-LFP|hBN gel|Li cell shows higher charge and lower discharge voltages. The gravimetric discharge capacity is about 160 mAh $g^{-1}$, about 160 mAh $g^{-1}$, about 137 mAh $g^{-1}$, and about 74 mAh $g^{-1}$, at 4 C, 10 C, 20 C, and 40 C, respectively.

The superlative electrochemical properties of the hBN gel electrolyte at about 175° C. allow operation at C-rates up to 10 C without decreasing capacity, as shown in FIGS. 6B and 16. Although cycling at 10 C shows higher charge and lower discharge voltages than equivalent measurements at 4 C, the voltage profiles still possess well-defined plateaus and stable operation. Indeed, the cell tested over 100 cycles at 10 C at about 175° C. (FIG. 6C) exhibits a relatively high gravimetric discharge capacity retention of about 90% (first cycle: 160 mAh g$^{-1}$; 100th cycle: about 144 mAh g$^{-1}$). Stable performance at about 175° C. represents the highest reported operating temperature among solid-state rechargeable lithium-ion batteries, confirming the high safety and thermal stability of hBN gel electrolytes for high-temperature applications.

In sum, in the exemplary example, high-performance solid-state electrolytes have been developed using high-modulus gels based on exfoliated, carbon-coated hBN nanosheets and EMIM-TFSI ionic liquid containing LiTFSI salt. Compared to conventional bulk hBN microparticles, the exfoliated hBN nanosheets improve the mechanical strength of gel electrolytes by two orders of magnitude without compromising ionic conductivity. In particular, with storage moduli as high as about 5 MPa and high room-temperature ionic conductivities in excess of about 1 mS cm$^{-1}$, the exfoliated hBN gel electrolytes provide superlative performance in rechargeable lithium-ion batteries while concurrently suppressing lithium dendrite growth. In addition, the hBN nanosheets stabilize the ionic liquid in the gel electrolytes, thereby reducing side reactions with electrodes at high potentials. The resulting high electrochemical stability (greater than about 5 V vs Li/Li+) also allows the hBN gel electrolytes to be effectively employed in high-voltage lithium-ion batteries. Finally, the high thermal stability of the hBN gel electrolytes enables the fabrication of rechargeable lithium-ion batteries that can be cycled at rates as high as 10 C and high temperatures up to about 175° C. Overall, this work establishes exfoliated hBN ionic liquid gels as a high-voltage solid-state electrolyte that improves the safety and operating temperature range of rechargeable lithium-ion batteries.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

LIST OF REFERENCES

[1]. Chu, S. & Majumdar, A. Opportunities and challenges for a sustainable energy future. Nature 488, 294-303 (2012).

[2]. Sun, Y., Liu, N. & Cui, Y. Promises and challenges of nanomaterials for lithium-based rechargeable batteries. Nat. Energy 1, 16071 (2016).

[3]. Schmuch, R., Wagner, R., Hörpel, G., Placke, T. & Winter, M. Performance and cost of materials for lithium-based rechargeable automotive batteries. Nat. Energy 3, 267-278 (2018).

[4]. Dunn, B., Kamath, H. & Tarascon, J.-M. Electrical energy for the grid: a choice of battery. Science 334, 928-935 (2011).

[5]. Goodenough, J. B. & Park, K.-S. The Li-ion rechargeable battery: a perspective. J. Am. Chem. Soc. 135, 1167-1176 (2013).

[6]. Tarascon J.-M. & Armand, M. Issues and challenges facing rechargeable lithium batteries. Nature 414, 359-367 (2001).

[7]. Balakrishnan, P. G., Ramesh, R. & Prem Kumar, T. Safety mechanisms in lithium-ion batteries. J. Power Sources 155, 401-414 (2006).

[8]. Manthiram, A., Yu, X. & Wang, S. Lithium battery chemistries enabled by solid-state electrolytes. Nat. Rev. Mater. 2, 16103 (2017).

[9]. Gao, Z. et al. Promises, challenges, and recent progress of inorganic solid-state electrolytes for all-solid-state lithium batteries. Adv. Mater. 30, 1705702 (2018).

[10]. Lau, J. et al. Sulfide solid electrolytes for lithium battery applications. Adv. Energy Mater. 8, 1800933 (2018).

[11]. Thangadurai V., Narayanan, S. & Pinzaru, D. Garnet-type solid-state fast Li ion conductors for Li batteries: critical review. Chem. Soc. Rev. 43, 4714-4727 (2014).

[12]. Bideau, J. L., Viaub, L. & Vioux, A. Ionogels, ionic liquid based hybrid materials. Chem. Soc. Rev. 40, 907-925 (2011).

[13]. Chen, N., Zhang, H., Li, L., Chen, R. & Guo, S. Ionogel electrolytes for high-performance lithium batteries: a review. Adv. Energy Mater. 8, 1702675 (2018).

[14]. Lewandowski, A. & Świderska-Mocek, A. Ionic liquids as electrolytes for Li-ion batteries—an overview of electrochemical studies. J. Power Sources 194, 601-609 (2009).

[15]. Garcia, B., Lavallée, S., Perron, G., Michot, C. & Armand, M. Room temperature molten salts as lithium battery electrolyte. Electrochim. Acta 49, 4583-4588 (2004).

[16]. Kim G.-T. et al. Development of ionic liquid-based lithium battery prototypes. J. Power Sources 199, 239-246 (2012).

[17]. Choudhury, S., Mangal, R., Agrawal, A. & Archer, L. A. A highly reversible room-temperature lithium metal battery based on crosslinked hairy nanoparticles. Nat. Commun. 6, 10101 (2015).

[18]. Stone, G. M. et al. Resolution of the modulus versus adhesion dilemma in solid polymer electrolytes for rechargeable lithium metal batteries. J. Electrochem. Soc. 159, A222-A227 (2012).

[19]. Lu, Y., Korf, K., Kambe, Y., Tu, Z. & Archer, L. A. Ionic-liquid-nanoparticle hybrid electrolytes: applications in lithium metal batteries. Angew. Chem. Int. Ed. 53, 488-492 (2014).

[20]. Patel, M., Gnanavel, M. & Bhattacharyya, A. J. Utilizing an ionic liquid for synthesizing a soft matter polymer "gel" electrolyte for high rate capability lithium-ion batteries. J. Mater. Chem. 21, 17419-17424 (2011).

[21]. Lu, Y., Moganty, S. S., Schaefer, J. L. & Archer, L. A. Ionic liquid-nanoparticle hybrid electrolytes. J. Mater. Chem. 22, 4066-4072 (2012).

[22]. Moganty, S. S., Jayaprakash, N., Nugent, J. L., Shen, J. & Archer, L. A. Ionic-liquid-tethered nanoparticles: hybrid electrolytes. Angew. Chem. Int. Ed. 49, 9158-9161 (2010).

[23]. Lee, J. H. et al. Hybrid ionogels derived from polycationic polysilsesquioxanes for lithium ion batteries. Polymer 117, 160-166 (2017).

[24]. Pablos, J. L. et al. Highly efficient mixed $Li^+$ transport in ion gel polycationic electrolytes. J. Memb. Sci. 545, 133-139 (2018).

[25]. Lee, J. H. et al. Hybrid ionogel electrolytes for high temperature lithium batteries. J. Mater. Chem. A 3, 2226-2233 (2015).

[26]. Kubota, Y., Watanabe, K., Tsuda, O. & Taniguchi, T. Deep ultraviolet light-emitting hexagonal boron nitride synthesized at atmospheric pressure. Science 317, 932-934 (2007).

[27]. Kim, K. K. et al. Synthesis of monolayer hexagonal boron nitride on Cu foil using chemical vapor deposition. Nano Lett. 12, 161-166 (2012).

[28]. Yan, K. et al. Ultrathin two-dimensional atomic crystals as stable interfacial layer for improvement of lithium metal anode. Nano Lett. 14, 6016-6022 (2014).

[29]. Rodrigues, M.-T. F. et al. Hexagonal boron nitride-based electrolyte composite for li-ion battery operation from room temperature to 150° C. Adv. Energy Mater. 6, 1600218 (2016).

[30]. Liang, Y. T. & Hersam, M. C. Highly concentrated graphene solutions via polymer enhanced solvent exfoliation and iterative solvent exchange. J. Am. Chem. Soc. 132, 17661-17663 (2010).

[31]. Rosso, M., Gobron, T., Brissot, C., Chazalviel, J.-N. & Lascaud, S. Onset of dendritic growth in lithium/polymer cells. J. Power Sources 97-98, 804-806 (2001).

[32]. Matsumoto, H., Sakaebe, H. & Tatsumi, K. Preparation of room temperature ionic liquids based on aliphatic onium cations and asymmetric amide anions and their electrochemical properties as a lithium battery electrolyte. J. Power Sources 146, 45-50 (2005).

[33]. MacNeil, D. D., Lu, Z., Chen, Z. & Dahn, J. R. A comparison of the electrode/electrolyte reaction at elevated temperatures for various Li-ion battery cathodes. J. Power Sources 108, 8-14 (2002).

[34]. Rodrigues, M.-T. F. et al. A materials perspective on Li-ion batteries at extreme temperatures. Nat. Energy 2, 17108 (2017).

[35]. Chen, K.-S. et al. Comprehensive enhancement of nanostructured lithium-ion battery cathode materials via conformal graphene dispersion. Nano Lett. 17, 2539-2546 (2017).

[36]. Hayamizu, K. Aihara, Y., Nakagawa, H., Nukuda, T. & Price, W. S. Ionic conduction and ion diffusion in binary room-temperature ionic liquids composed of [emim][$BF_4$] and $LiBF_4$. J. Phys. Chem. B 108, 19527-19532 (2004).

[37]. Grandjean, A., Malki, M., Simonnet, C., Manara, D. & Penelon, B. Correlation between electrical conductivity, viscosity, and structure in borosilicate glass-forming melts. Phys. Rev. B 75, 054112 (2007).

[38]. Andersson, A. S., Thomas, J. O., Kalska, B. & Haggstrom, L. Thermal stability of $LiFePO_4$-based cathodes. Electrochem. Solid-State Lett. 3, 66-68 (2000).

[39]. Takahashi, M., Tobishima, S., Takei, K. & Sakurai, Y. Reaction behavior of LiFePO4 as a cathode material for rechargeable lithium batteries. Solid State Ionics 148, 283-289 (2002).

[40]. Delacourt, C., Poizot, P., Tarascon, J.-M. & Masquelier, C. The existence of a temperature-driven solid solution in $Li_xFePO_4$ for $0 \leq x \leq 1$. Nat. Mater. 4, 254-260 (2005).

What is claimed is:

1. A gel electrolyte for an electrochemical device, comprising:
   an ionic liquid; and
   carbon-coated hexagonal boron nitride (hBN) nanosheets mixed in the ionic liquid, comprising exfoliated hBN nanosheets produced by liquid-phase exfoliating a dispersion containing bulk hBN microparticles and ethyl cellulose, and an annealation product of the ethyl cellulose comprising an amorphous carbon coating on surfaces of the exfoliated hBN nanosheets, such that
   the carbon-coated hBN nanosheets have a C 1s carbon region in X-ray photoelectron spectroscopy (XPS) that is deconvoluted into three peaks associated with C—C at about 285 eV, C—O at about 286 eV, and O—C=O at about 289 eV, and
   the gel electrolyte has a storage modulus of about 5 MPa, while retains ionic conductivity greater than about 1 mS cm-1 at room temperature.

2. The gel electrolyte of claim 1, wherein the ionic liquid comprises a non-aqueous solvent of an ammonium-imidazolium-, pyrrolidinium-, pyridinium-, piperidinium-, phosphonium-, or sulfonium-based ionic liquid.

3. The gel electrolyte of claim 2, wherein the ionic liquid comprises a lithium ionic liquid (Li-IL).

4. The gel electrolyte of claim 3, wherein the ionic liquid further comprises one or more lithium salts including lithium bis(trifluoromethylsulfonyl)imide (LiTFSI), lithium bis(fluorosulfonyl)imide, (LiFSI), lithium hexafluorophosphate ($LiPF_6$), lithium tetrafluoroborate ($LiBF_4$), lithium perchlorate ($LiClO_4$), lithium trifluoromethanesulfonate, lithium fluoroalkylsufonimides, lithium fluoroarylsufonimides, lithium bis(oxalate borate), lithium tris(trifluoromethylsulfonylimide)methide, lithium tetrachloroaluminate, lithium chloride, or any combination thereof.

5. The gel electrolyte of claim 4, wherein the Li-IL comprises 1-ethyl-3-methylimidazolium bis(trifluoromethylsulfonyl)imide (EMIM-TFSI) containing a lithium bis(trifluoromethylsulfonyl)imide (LiTFSI) salt.

6. The gel electrolyte of claim 1, having 20-55 wt. % of the carbon-coated hBN nanosheets.

7. An electrochemical device, comprising the gel electrolyte of claim 1.

8. The electrochemical device of claim 7, further comprising an anode electrode and a cathode electrode, wherein the gel electrolyte is placed between the anode and the cathode electrodes.

9. The electrochemical device of claim 8, wherein the gel electrolyte separates the anode and cathode electrodes without a separator.

10. The electrochemical device of claim 8, wherein the anode electrode is formed of a lithium metal, graphite, lithium titanium oxide ($Li_4Ti_5O_{12}$, LTO), or a combination thereof.

11. The electrochemical device of claim 8, wherein the cathode electrode is formed of lithium titanium oxide ($Li_4Ti_5O_{12}$, LTO), lithium iron phosphate ($LiFePO_4$, LFP), graphene-added LFP (Gr-LFP), lithium nickel manganese cobalt oxide ($LiNi_{0.33}Mn_{0.33}Co_{0.33}O_2$, NMC), lithium nickel manganese oxide ($LiNi_{0.5}Mn_{1.5}O_4$, LNMO), lithium cobalt oxide ($LiCoO_2$), lithium manganese oxide ($LiMn_2O_4$, LMO), lithium nickel cobalt aluminium oxide ($LiNiCoAlO_2$, NCA), or a combination thereof.

12. The electrochemical device of claim 7, being a solid-state rechargeable battery, a fuel cell, a supercapacitor, or a transistor.

13. The gel electrolyte of claim 1, wherein the carbon-coated-hBN nanosheets have an average lateral size of about 143±67 nm, and an average thickness of about 2.4±1.2 nm.

* * * * *